US010331388B2

United States Patent
Fukasawa

(10) Patent No.: US 10,331,388 B2
(45) Date of Patent: Jun. 25, 2019

(54) IMAGE PROCESSING SYSTEM, IMAGE PROCESSING METHOD, AND NON-TRANSITORY STORAGE MEDIUM STORING IMAGE PROCESSING PROGRAM

(71) Applicant: Naoki Fukasawa, Kanagawa (JP)

(72) Inventor: Naoki Fukasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/869,660

(22) Filed: Jan. 12, 2018

(65) Prior Publication Data

US 2018/0136886 A1    May 17, 2018

Related U.S. Application Data

(63) Continuation of application No. 15/068,856, filed on Mar. 14, 2016, now Pat. No. 9,904,495.

(30) Foreign Application Priority Data

Mar. 19, 2015 (JP) ................................ 2015-055965

(51) Int. Cl.
*G06K 15/00* (2006.01)
*G06F 3/12* (2006.01)

(52) U.S. Cl.
CPC .......... *G06F 3/1222* (2013.01); *G06F 3/1204* (2013.01); *G06F 3/1238* (2013.01);
(Continued)

(58) Field of Classification Search
CPC ..... G06F 3/1222; G06F 3/1238; G06F 3/1292
(Continued)

(56) References Cited

U.S. PATENT DOCUMENTS 7,142,333 B2 * 11/2006 Struble .............. G06Q 30/0601
358/402
7,409,452 B2 * 8/2008 Ragnet .............. G06F 17/30011
358/1.15
(Continued)

FOREIGN PATENT DOCUMENTS

JP    2001-014255    1/2001
JP    2001-344162    12/2001
(Continued)

OTHER PUBLICATIONS

Japanese Office Action for 2015-055965 filed on Mar. 19, 2015, dated Apr. 25, 2017.
(Continued)

*Primary Examiner* — Neil R McLean
(74) *Attorney, Agent, or Firm* — IPUSA, PLLC

(57) ABSTRACT

An image processing system includes at least one image processing apparatus, an information terminal, and an information processing device configured to communicate with the at least one image processing apparatus and the information terminal. The information terminal includes a specifying information transmitter configured to transmit, to the information processing device, specifying information for specifying, from the at least one image processing apparatus, a first image processing apparatus for inputting and a second image processing apparatus for outputting. The information processing device includes an input data retrieval unit configured to obtain input data from the first image processing apparatus for inputting based on the specifying information received from the information terminal, and an output data transmitter configured to transmit, based on the received specifying information, output data corresponding to the obtained input data to the second image processing apparatus for outputting.

3 Claims, 22 Drawing Sheets

(52) U.S. Cl.
CPC .......... *G06F 3/1288* (2013.01); *G06F 3/1292* (2013.01); *G06F 3/1275* (2013.01)

(58) Field of Classification Search
USPC ........................................................ 358/1.14
See application file for complete search history.

(56) References Cited

U.S. PATENT DOCUMENTS

| | | | |
|---|---|---|---|
| 8,020,170 | B2 | 9/2011 | Fukasawa |
| 8,237,949 | B2* | 8/2012 | Ferlitsch ............ H04N 1/00127 |
| | | | 358/1.15 |
| 8,264,743 | B2 | 9/2012 | Fukasawa |
| 8,477,325 | B2 | 7/2013 | Fukasawa |
| 8,836,981 | B2 | 9/2014 | Takahashi |
| 8,848,224 | B2 | 9/2014 | Fukasawa |
| 2004/0153530 | A1* | 8/2004 | Machida ............. H04L 41/0803 |
| | | | 709/220 |
| 2004/0205169 | A1 | 10/2004 | Machida |
| 2011/0058219 | A1 | 3/2011 | Fukasawa |
| 2013/0246777 | A1 | 9/2013 | Fukasawa |
| 2013/0342866 | A1* | 12/2013 | Hansen ................ H04N 1/4413 |
| | | | 358/1.14 |
| 2014/0293312 | A1 | 10/2014 | Fukasawa |
| 2015/0087356 | A1 | 3/2015 | Kobayashi |

FOREIGN PATENT DOCUMENTS

| | | |
|---|---|---|
| JP | 2011-044040 | 3/2011 |
| JP | 2013-025774 | 2/2013 |
| JP | 2014-179014 | 9/2014 |
| JP | 2014-220768 | 11/2014 |

OTHER PUBLICATIONS

Japanese Office Action for 2015-055965 filed on Mar. 19, 2015, dated Jul. 11, 2017.
Japanese Office Action for 2017-207015 dated Oct. 23, 2018.

* cited by examiner

```
{
    "type": "mfp",
    "input": {
        "mime_type": ["application/pdf", "image/jpeg"],
        "settings": {
            "color_mode": ["color", "monochrome"],
            "resolution": ["200dpi", "400dpi", "600dpi"],
            "2sided": ["none", "left_binding", "top_binding"]
        }
    },
    "output": {
        "mime_type": ["application/pdf", "application/postscript"],
        "settings": {
            "color_mode": ["color", "monochrome"],
            "resolution": ["200dpi", "400dpi", "600dpi", "1200dpi"],
            "2sided": ["none", "left_binding", "top_binding"],
            "nup": ["none", "2in1", "4in1"],
            "copies": {"min": 1, "max": 999}
        }
    }
}
```
901

| 1001 | | |
|---|---|---|
| COLOR MODE | COLOR | ~1002 |
| RESOLUTION | 200DPI | ~1003 |
| SIDE OF DOCUMENT | SINGLE SIDE | ~1004 |
| LAYOUT | 1on1 | ~1005 |
| NUMBER OF COPIES | 1 | ~1006 |

| 1007 | |
|---|---|
| COLOR | ~1008 |
| MONOCHROME | ~1009 |

```
{
    "input":[
        "type":"whiteboard",
        "host":"192.168.1.11",
        "mime_type":["image/jpeg","image/tiff"],
        "settings":{
        }
    ],
    "output":{
        "type":"mfp",
        "host":"192.168.1.12",
        "mime_type":["application/pdf","application/postscript"],
        "settings":{
            "color_mode":"color",
            "resolution":"200dpi",
            "2sided":"none",
            "nup":"2in1",
            "copies":2
        }
    }
}
```

1201 image/jpeg -> application/pdf
application/msword -> application/pdf
application/pdf -> image/jpeg

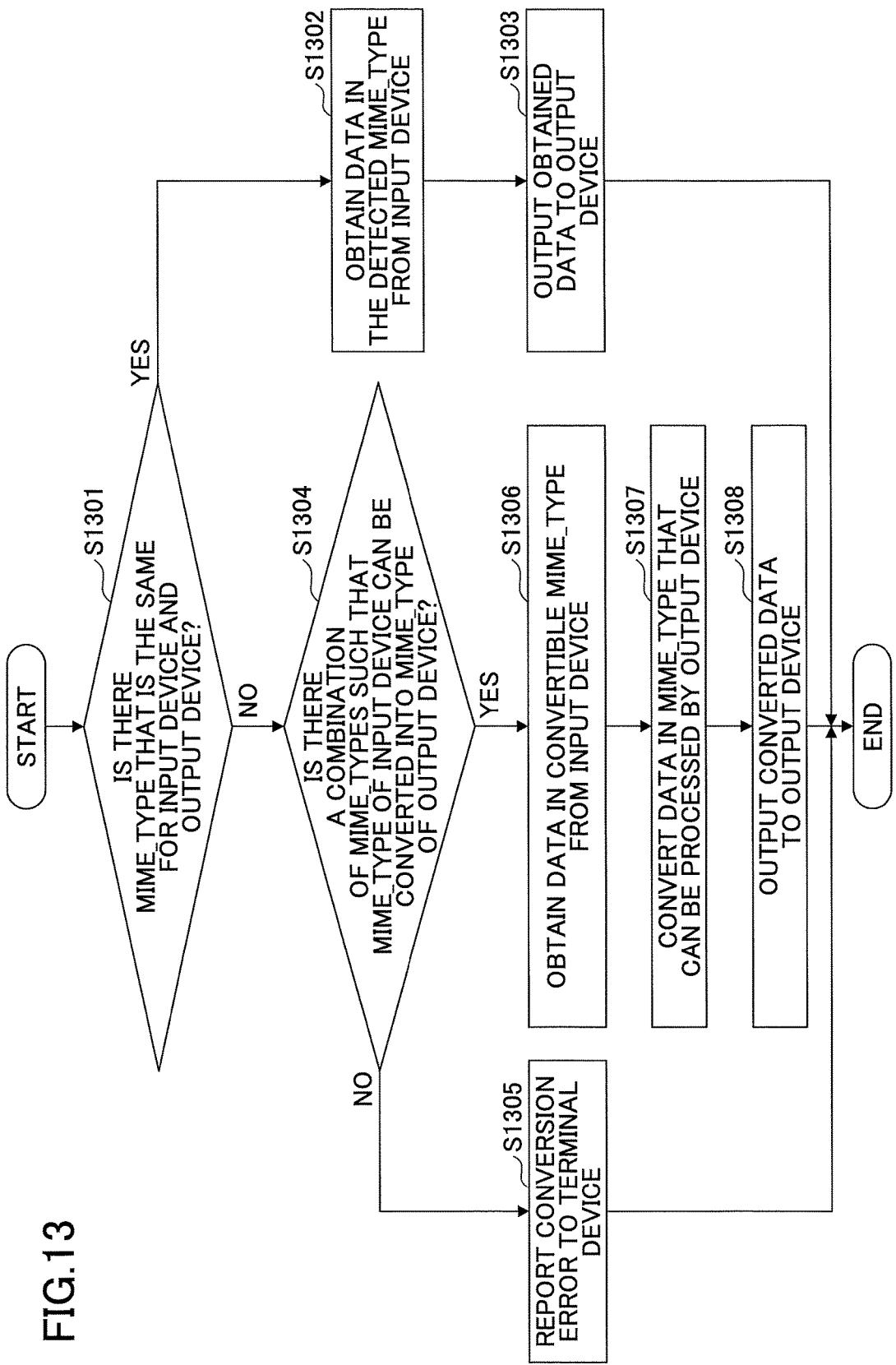

```
{
 "mime_type": "image/jpeg",
 "settings":{
 }
}
```

```
{
 "mime_type": "application/pdf",
 "settings":{
  "color_mode": "color",
  "resolution": "200dpi",
  "2sided": "none",
  "nup": "2in1",
  "copies": 2
 }
}
```

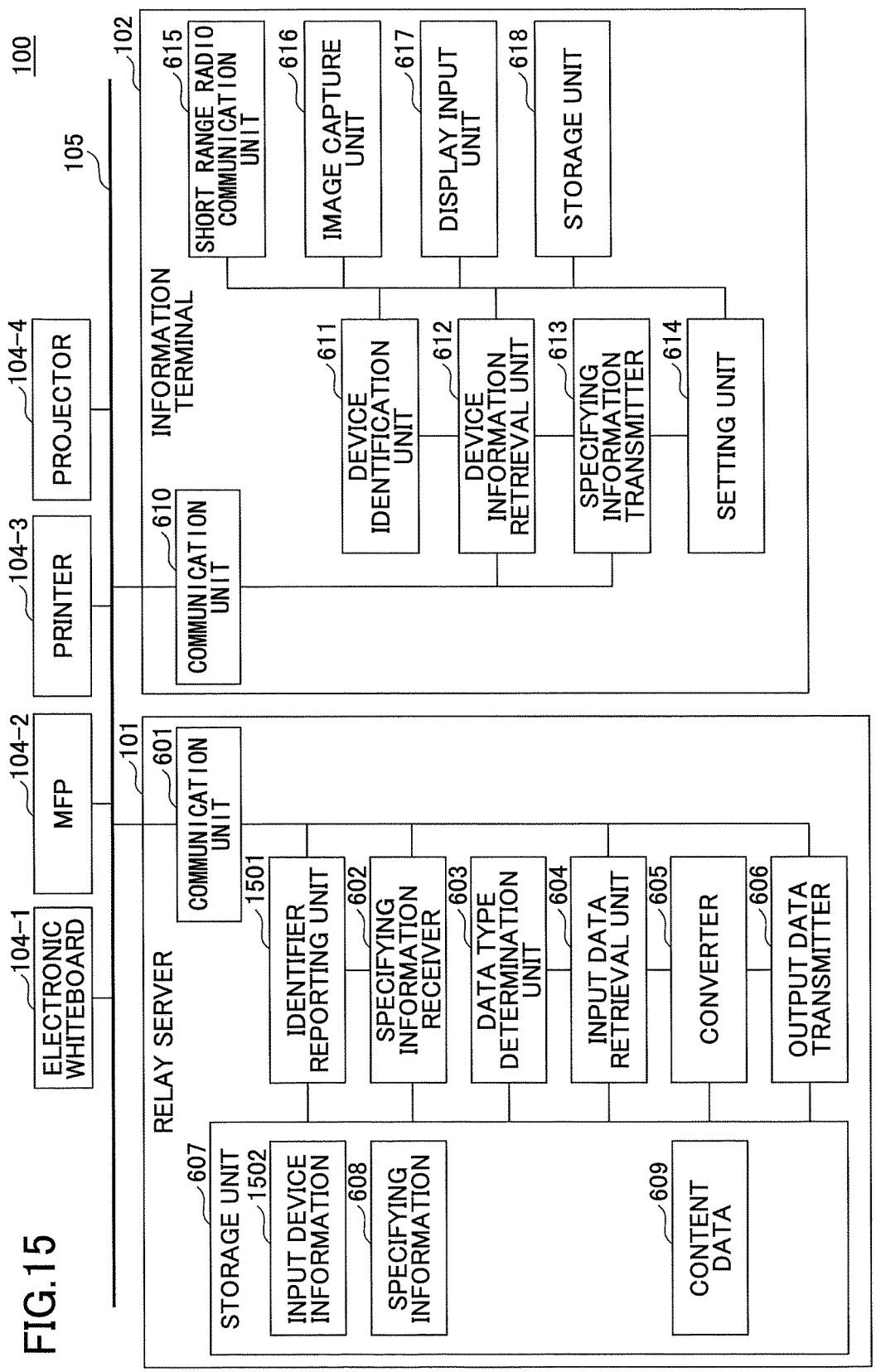

1701

```
{
    "input": [
        {
            "type": "whiteboard",
            "host": "192.168.1.11",
            "mime_type": ["image/jpeg", "image/tiff"],
            "settings": [
            }
        }
    ]
}
```

```
{
    "ticket": "Ghy6lO1h4gMadKhj"
}
```

```
{
    "ticket": "Ghy6IO1h4gMadKhj",
    "output": [
        {
            "type": "mfp",
            "host": "192.168.1.12",
            "mime_type": ["application/pdf", "application/postscript"],
            "settings": {
                "color_mode": "color",
                "resolution": "200dpi",
                "2sided": "none",
                "nup": "2in1",
                "copies": 2
            }
        }
    ]
}
```

1801

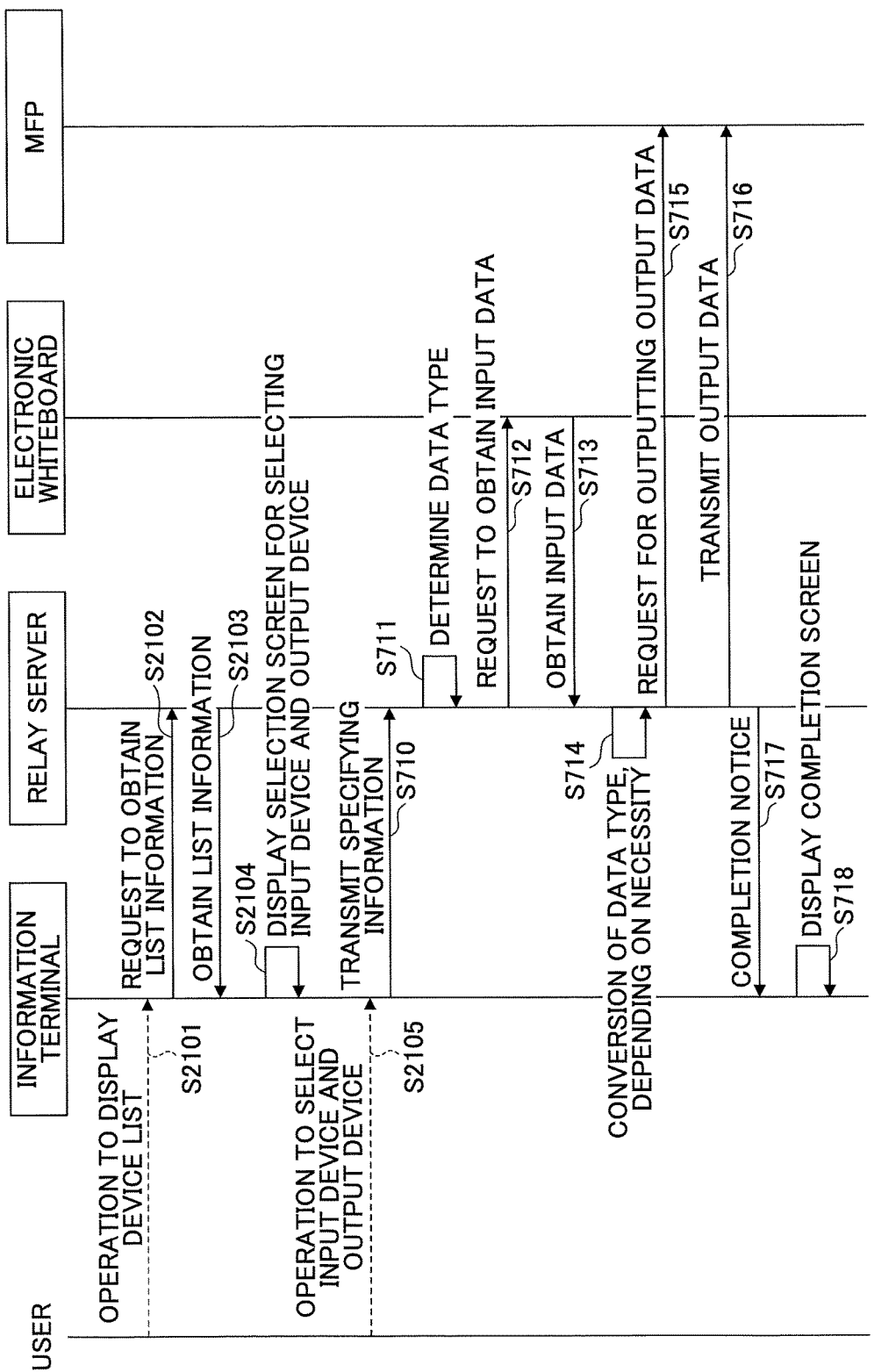

```
[
    {
        "type": "mfp", "id": "mfp1",
        "input": {
            "mime_type":["application/pdf","image/jpeg"],
            "settings": {
                "color_mode":["color","monochrome"],
                "resolution":["200dpi","400dpi","600dpi"],
                "2sided":["none","left_binding","top_binding"]
            }
        },
        "output": {
            "mime_type":["application/pdf","application/postscript"],
            "settings": {
                "color_mode": ["color", "monochrome"],
                "resolution": ["200dpi", "400dpi", "600dpi", "1200dpi"],
                "2sided": ["none", "left_binding", "top_binding"],
                "nup": ["none", "2in1", "4in1"],
                "copies": {"min": 1, "max": 999}
            }
        },
    },
    {
        "type": "whitenoard", "id": "whiteboard1",
        "input": {
            "mime_type": ["image/tif", "image/jpeg"],
            "settings": {}
        },
        "output": {
            "mime_type": ["image/tif", "image/jpeg"],
            "settings": {}
        }
    },
    {
        "type": "projector", "id": "projector"
        "input": {
            "mime_type": ["image/jpeg"],
            "settings": {}
        },
        "output": {
            "mime_type": ["image/jpeg"],
            "settings": {}
        }
    },
]
```

```
{
    "input": {
        "id": "whiteboard1",
        "settings": {
        }
    },
    "output": {
        "id": "mfp1",
        "settings": {
            "color_mode": "color",
            "resolution": "200dpi",
            "2sided": "none",
            "nup": "2in1",
            "copies": 2
        }
    }
}
```

IMAGE PROCESSING SYSTEM, IMAGE PROCESSING METHOD, AND NON-TRANSITORY STORAGE MEDIUM STORING IMAGE PROCESSING PROGRAM

CROSS-REFERENCE TO RELATED APPLICATIONS

This application is a continuation application filed under 35 U.S.C. 111(a) claiming the benefit under 35 U.S.C. 120 of U.S. patent application Ser. No. 15/068,856 filed on Mar. 14, 2016, which is based upon and claims the benefit of priority to Japanese Priority Patent Application No. 2015-055965 filed on Mar. 19, 2015, the entire contents of which are incorporated herein by reference.

BACKGROUND OF THE INVENTION

1. Field of the Invention

The present invention relates to an image processing system, an image processing method, and a non-transitory storage medium storing an image processing program.

2. Description of the Related Art

An image forming apparatus having a plurality of functions has been known, such as a multifunction peripheral/product (MFP) having, for example, a printing function, a copying function, a scanning function, and a facsimile transmission function. Additionally, a technique has been known such that an image forming function of an image forming apparatus is operated by using a smart device, such as a smartphone and a tablet terminal, by using an application program interface (API) provided by the image forming apparatus.

Furthermore, an output sorting device has been known that determines, based on user specific information extracted from an output request from a terminal, an image forming apparatus as an output destination, and drawing data corresponding to the output request is output to the determined output destination (c.f. Patent Document 1 (Japanese Unexamined Patent Publication No. 2013-25774, for example)).

According to related art, it is possible to operate a function of an image forming apparatus (e.g., a MFP) by using an information terminal; and the information terminal can access, for example, print data and scan data, which are to be processed. Accordingly, in an environment, such as a Bring Your Own Device (BYOD) environment where a personal smart device is connected to an office network and used, information may leak because data to be processed is stored in a personal smart device, for example.

For a case of controlling, by an information terminal, image processing that is to be executed by a plurality of image processing devices, such as a case where image information that is written on an interactive whiteboard is to be printed by a MFP, it has been difficult to control the process without storing, in the information terminal, data to be processed.

In this manner, according to the related art, it has been difficult to control, by using an information terminal, such as a smart device, image processing that is to be executed by a plurality of image processing devices, while preventing the data to be processed from being leaked.

There is a need for an image processing system that makes it easier to control, by using an information terminal, such as a smart device, image processing that is to be executed by a plurality of image processing devices, while preventing information of the data to be processed from being leaked.

SUMMARY OF THE INVENTION

According to an aspect of the present invention, there is provided an image processing system including at least one image processing apparatus, an information terminal, and an information processing device configured to communicate with the at least one image processing apparatus and the information terminal, wherein the information terminal includes a specifying information transmitter configured to transmit, to the information processing device, specifying information for specifying, from the at least one image processing apparatus, an image processing apparatus for inputting and an image processing apparatus for outputting, and wherein the information processing device includes an input data retrieval unit configured to obtain input data from the image processing apparatus for inputting based on the specifying information received from the information terminal, and an output data transmitter configured to transmit, based on the received specifying information, output data that is based on the obtained input data to the image processing apparatus for outputting.

According to another aspect of the present invention, there is provided a non-transitory storage medium storing an image processing program, wherein an image processing system comprises at least one image processing apparatus, an information terminal, and an information processing device configured to communicate with the at least one image processing apparatus and the information terminal to function, and the image processing program causes the information processing device to function as a specifying information receiver configured to receive specifying information for specifying, from the at least one image processing apparatus, a first image processing apparatus for inputting and a second image processing apparatus for outputting; an input data retrieval unit configured to obtain input data from the first image processing apparatus for inputting, based on the received specifying information; and an output data transmitter configured to transmit, based on the received specifying information, output data corresponding to the obtained input data to the second image processing apparatus for outputting.

According to another aspect of the present invention, there is provided a method to be executed by an image processing device, wherein an image processing system includes at least one image processing apparatus, an information terminal, and the information processing device configured to communicate with the at least one image processing apparatus and the information terminal to function. The method includes receiving specifying information for specifying, from the at least one image processing apparatus, a first image processing apparatus for inputting and a second image processing apparatus for outputting; obtaining input data from the first image processing apparatus for inputting, based on the received specifying information; and transmitting, based on the received specifying information, output data corresponding to the obtained input data to the second image processing apparatus for outputting.

According to the embodiment of the present invention, an image processing system can be provided that makes it easier to control, by using an information terminal, such as a smart device, image processing that is to be executed by a plurality of image processing devices, while preventing information of the data to be processed from being leaked.

Other objects, features and advantages of the present invention will become more apparent from the following detailed description when read in conjunction with the accompanying drawings.

BRIEF DESCRIPTION OF THE DRAWINGS

FIG. 9 is a diagram illustrating an example of device information according to the embodiment;

FIG. 10 is a diagram illustrating an example of a setting screen according to the embodiment;

FIG. 11 is a diagram illustrating an example of specifying information according to the embodiment;

FIG. 12 is a diagram illustrating an example of a convertible list according to the embodiment;

FIG. 13 is a flowchart illustrating an example of a determination process and a conversion process of a data type according to the embodiment;

FIG. 14A is a diagram illustrating an example of an input data retrieval request according to the embodiment;

FIG. 14B is a diagram illustrating an example of an output data retrieval request according to the embodiment;

FIG. 15 is a diagram illustrating an example of a functional configuration of the image processing system according to another embodiment;

FIG. 17A is a diagram illustrating an example of specifying information according to the other embodiment;

FIG. 17B is a diagram illustrating an example of identifying information for identifying a process;

FIG. 18 is a diagram illustrating another example of the specifying information according to the other embodiment;

FIG. 21 is a sequence chart illustrating an example of the image processing according to the further embodiment;

FIG. 22 is a diagram showing an example of list information according to the further embodiment;

FIG. 24 is a diagram illustrating an example of the specifying information according to the further embodiment.

DETAILED DESCRIPTION OF THE PREFERRED EMBODIMENTS

Embodiments of the present invention are described below by referring to the accompanying drawings.

<System Configuration>

Figure 1:
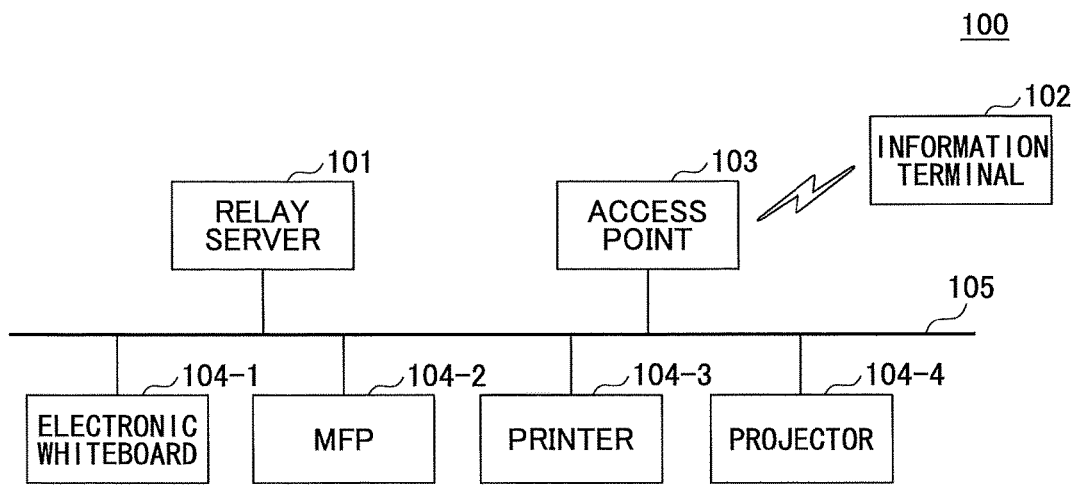
FIG. 1 is a diagram illustrating an example of a configuration of an image processing system according to an embodiment.

FIG. 1 is a diagram illustrating an example of a configuration of an image processing system 100 according to an embodiment. The image processing system 100 may include, for example, a relay server 101; an access point 103; an electronic whiteboard 104-1; a Multifunction Peripheral/Product (MFP) 104-2; a printer 104-3; and a projector 104-4, which are connected to a network 105, such as the Internet or a local area network (LAN). Additionally, the image processing system 100 may include an information terminal 102 that can be connected to the network 105 through the access point 103.

Here, the electronic whiteboard 104-1, the MFP 104-2, the printer 104-3, and the projector 104-4 are an example of at least one image processing apparatus that is included in the image processing system 100. The at least one image processing apparatus may include another image processing apparatus, such as a scanner, a camera, a display, a signage, a television, and a video conference device.

In the following description, any image processing apparatus of the at least one image processing apparatus may be denoted as an "image processing apparatus 104."

The relay server 101 is an information processing device that controls, in response to a command from the information terminal 102, a process of inputting image data from the at least one image processing apparatus 104, and a process of outputting image data to the at least one image processing apparatus 104. The relay server 101 controls, for example, a process of retrieving image data from an image processing apparatus 104 for inputting (e.g., the MFP 104-2), which is specified by the information terminal 102; and a process of outputting image data to an image processing apparatus 104 for outputting (e.g., the electronic whiteboard 104-1), which is specified by the information terminal 102.

The information terminal 102 is an information processing device, such as a smartphone, a tablet terminal, and a personal computer (PC). The information terminal 102 instructs the relay server 101 to execute a process of inputting image data from the above-described at least one image processing apparatus 104; and a process of outputting image data to the at least one image processing apparatus 104.

The access point 103 is a connection device for connecting a wireless LAN device, such as the information terminal 102, to the network 105. The access point 103 executes an authentication process for a wireless LAN device that requests to connect to the network 105; and, in response to detecting that the authentication is approved for the wireless LAN device, the access point 103 allows the wireless LAN device to connect to the network 105. The wireless LAN device for which the authentication is approved by the access point 103 is allowed to execute data communication with a network device, such as the relay server 101 and the at least one image processing apparatus 104, which are connected to the network 105.

The electronic whiteboard 104-1 is an image processing apparatus, which may be formed by installing a touch panel on a flat panel display, such as a liquid crystal display, or on a projection screen of a projector. A user can input drawing data on the electronic whiteboard 104-1 by hand writing, while the electronic whiteboard 104-1 is displaying a material, for example.

The MFP 104-2 is an image processing apparatus with a plurality of image forming functions, such as a printing function, a copying function, a scanning function, and a facsimile function. A printer 104-3 is an image processing apparatus with an image printing function. The projector 104-4 is an image processing apparatus with an image projection function.

With the above-described configuration, a user transmits, to the relay server, the specifying information for specifying the image processing apparatus 104 for inputting and the image processing apparatus 104 for outputting by using the information terminal 102. Further, upon receiving the specifying information from the information terminal 102, the relay server 101 obtains input data from the image processing apparatus 104 for inputting based on the specifying information, and the relay server 101 transmits, to the image processing apparatus 104 for outputting, output data based on the obtained input data. At this time, the information terminal 102 can control image processing by the plurality of image processing devices 104, without obtaining, by the information terminal 102, the data to which the image processing is applied.

In this manner, according to the embodiment, the image processing system 100 can be provided that makes it easier to control, by using the information terminal 102, such as a smart device, image processing that is to be executed by the plurality of image processing devices 104, while preventing information of the data to be processed from being leaked.

Note that the system configuration of FIG. 1 is for exemplifying purposes only, and various system configurations can be applied for the image processing system 100 according to the embodiment.

Figure 2:
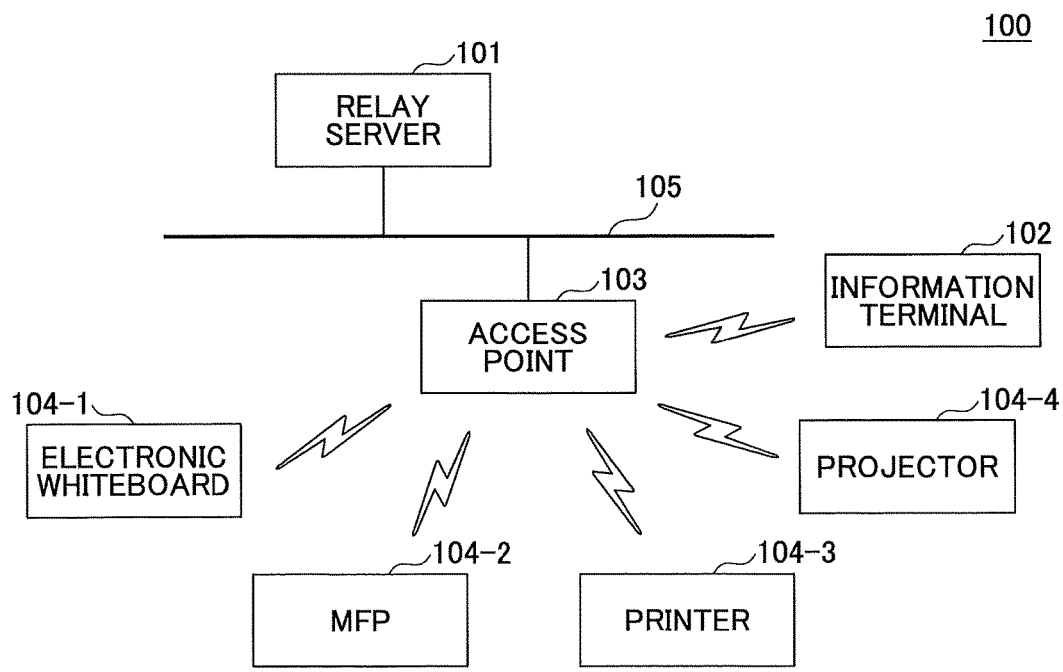
FIG. 2 is a diagram illustrating another example of the configuration of the image processing system according to the embodiment.

FIG. 2 is a diagram showing another example of a system configuration of the image processing system 100 according to the embodiment. In the example of FIG. 2, the electronic whiteboard 104-1, the MFP 104-2, the printer 104-3, and the projector 104-4 are connected to the network 105 through the access point 103. In this manner, the at least one image processing apparatus 104 may be connected to the network 105 by radio communication, such as the radio communication through a wireless LAN.

Additionally, the image processing system 100 may include the image processing apparatuses 104 that are connected by a wired LAN; and the image processing apparatuses 104 that are connected by a wireless LAN.

<Hardware Configuration>

(Hardware Configuration of the Relay Server)

Figure 3:
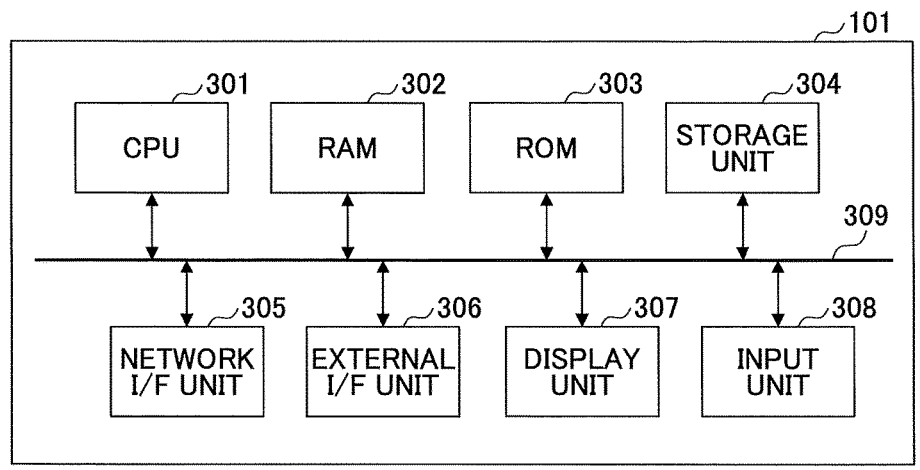
FIG. 3 is a diagram illustrating an example of a hardware configuration of a relay server according to the embodiment.

FIG. 3 is a diagram illustrating an example of a hardware configuration of the relay server 101 according to the embodiment. The relay server 101 may be configured as a general-purpose computer. The relay server 101 may include, for example, a central processing unit (CPU) 301; a random access memory (RAM) 302; a read-only memory (ROM) 303; a storage unit 304; a network interface (I/F) 305; an external I/F 306; a display unit 307; an input unit 308; and a bus 309.

The CPU 301 is a processor for implementing functions of the relay server 101 by reading out one or more programs and data stored in the ROM 303 and/or the storage unit 304, writing the read one or more programs and data in the RAM 302, and executing one or more processes. The RAM 302 is a volatile memory that is used as a work area of the CPU 301.

The ROM 303 is a non-volatile memory for maintaining one or more programs and data, even if a power supply of the relay server 101 is turned off. The ROM 303 may be formed of a flash ROM, for example. The storage unit 304 is a storage device, such as a hard disk drive (HDD) and a solid state drive (SSD), for example. The storage unit 304 stores, for example, an operating system (OS), one or more application programs, and various types of data.

The network I/F unit 305 is a communication interface of, for example, a wired LAN and/or a wireless LAN for connecting the relay server 101 to the network 105; and for transmitting data to and receiving data from the information terminal 102 or the image processing apparatus 104.

The external I/F unit 306 is an interface for connecting the relay server 101 to an external device. Examples of the external device includes a recording medium, such as a USB memory, a memory card, and an optical disk; and various types of electronic devices.

The display unit 307 is a display device, such as a liquid crystal display (LCD), for displaying a processing result of the relay server 101, for example. The input unit 308 is an input device, such as a keyboard, a mouse, and a touch panel, for receiving an input for operating the relay server 101. Note that the display unit 307 or the input unit 308 may be formed outside the relay server 101. The bus 309 is connected to the above-described components of the relay server 101. The bus 309 transmits an address signal, a data signal, and various types of control signals.

(Hardware Configuration of the Information Terminal)

Figure 4:
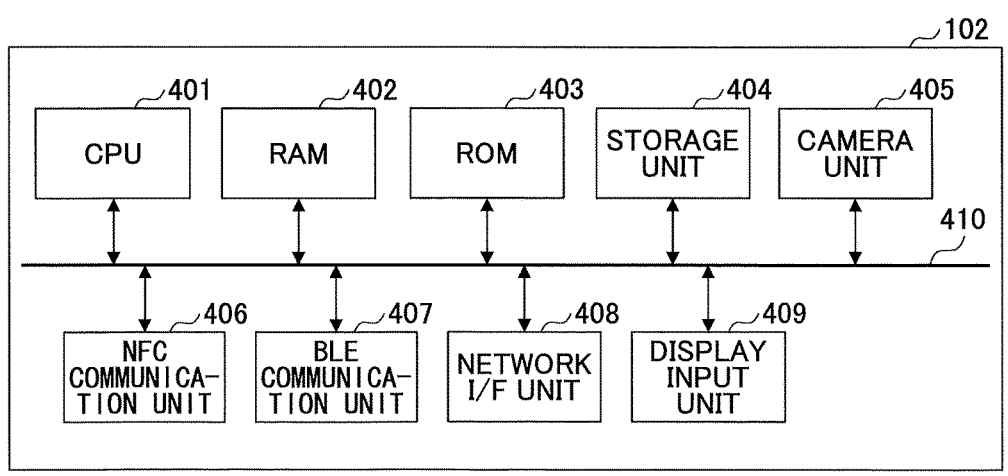
FIG. 4 is a diagram illustrating an example of a hardware configuration of an information terminal according to the embodiment.

FIG. 4 is a diagram illustrating an example of a hardware configuration of the information terminal 102 according to the embodiment. The information terminal 102 may be configured as a general-purpose computer. The information terminal 102 may include, for example, a CPU 401; a RAM 402; a ROM 403; a storage unit 404; a camera unit 405; a near field communication unit (NFC) 406; a Bluetooth (registered trademark) Low Energy (which is referred to as the BLE, hereinafter) communication unit 407; a network I/F unit 408; a display input unit 409; and a bus 410.

Here, the configurations of the CPU 401, the RAM 402; the ROM 403; the storage unit 404; and the bus 410 are the same as the configurations of the corresponding components of the relay server 101 of FIG. 3. Thus, the differences of the configuration of the information terminal 102 from the configuration of the relay server 101 are mainly described.

The camera unit 405 is an image capturing device for capturing an image. For example, the camera unit 405 is used for capturing an image of a two-dimensional code of the image processing apparatus 104, such as a quick response (QR) code (registered trademark), to obtain address information and/or device information of the image processing apparatus 104.

The NFC communication unit 406 is a communication device for communicating with a NFC reader/writer based on the NFC communication, upon detecting, for example, that a distance between the NFC communication unit 406 of the information terminal 102 and the NFC reader/writer of the image processing apparatus 104 is less than or equal to a predetermined distance (e.g., less than or equal to 10 cm). The NFC communication unit 406 is used for obtaining, from the NFC reader/writer of the image processing apparatus 104, address information and/or device information of the image processing apparatus 104, for example.

The BLE communication unit 407 is a communication device for executing, for example, BLE-based communication with the image forming apparatus 104. The BLE is one of extended standards of the Bluetooth standard, which is a short range radio communication standard. The BLE is developed as a part of the Bluetooth 4.0 standard, and the BLE specifies a short range radio communication technology. According to the BLE-based communication, data communication by short range radio communication can be implemented with energy consumption that is lower than the energy consumption by normal Bluetooth communication.

Note that, the NFC communication unit 406 and the BLE communication unit 407 are an example of the short range radio communication unit that is included in the information terminal 102. The information terminal 102 may execute communication with the image processing apparatus 104 by another short range radio communication scheme, instead of using the NFC communication unit 406 and the BLE communication unit 407.

The network I/F unit 408 is a communication interface, such as a communication interface for a wireless LAN, for connecting the information terminal 102 to the network 105, and for transmitting data to and receiving data from the relay server 101.

The display input unit 409 is a device for displaying and inputting, such as a touch panel display where a touch panel and a display are integrated. The display input unit 409 may include an input unit for operating the information terminal 102; and a display unit for displaying a processing result of the information terminal 102. Here, the display input unit 409 may include a display unit and an input unit, which are separate units.

(Hardware Configuration of the Image Processing Apparatus)

Figure 5:
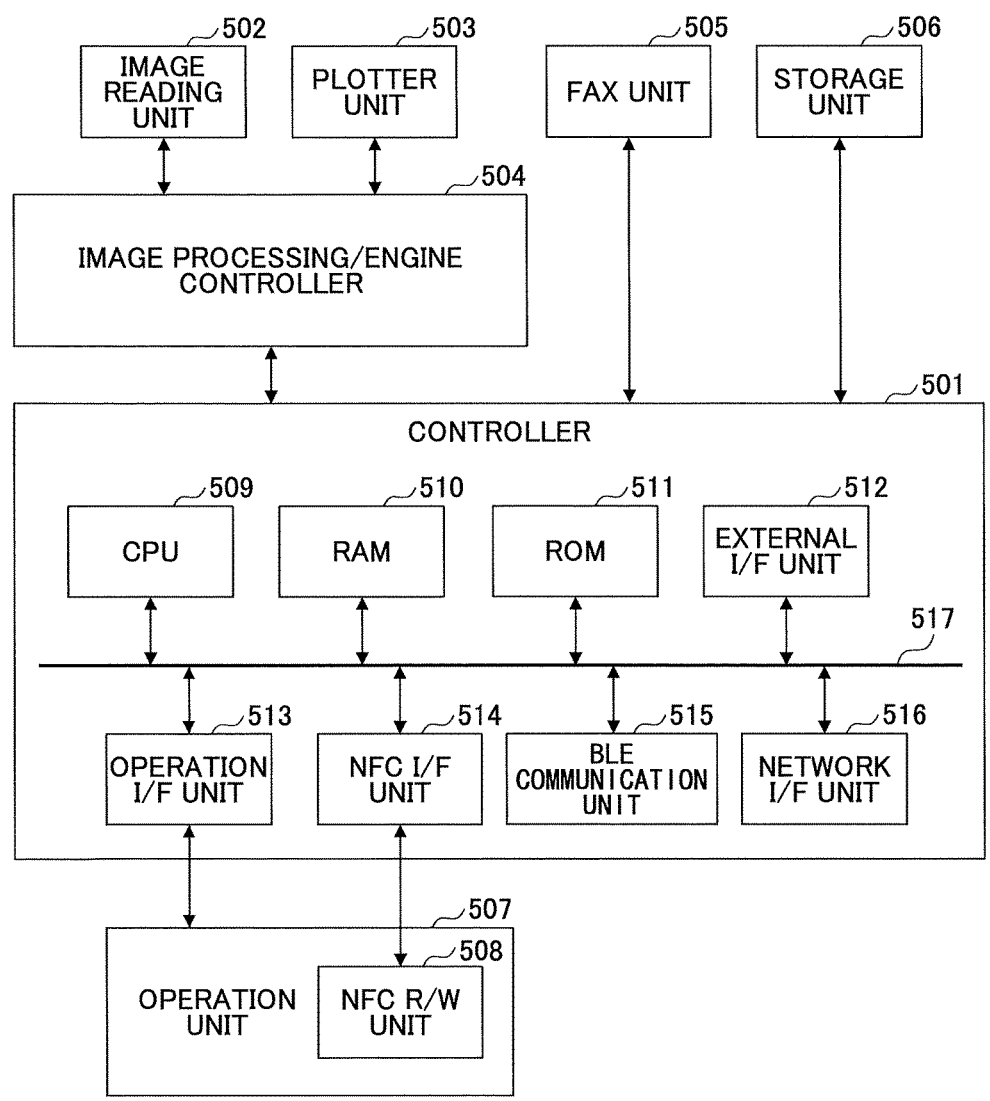
FIG. 5 is a diagram illustrating an example of a hardware configuration of an image processing apparatus according to the embodiment.

FIG. 5 is a diagram illustrating an example of a hardware configuration of the image processing apparatus 104 according to the embodiment. Here, an example of a hardware configuration of a MFP is described as an example of the hardware configuration of the image processing apparatus 104.

The image processing apparatus (MFP) 104 may include a controller 501; an image reading unit 502; a plotter unit 503; an image processing/engine controller 504; a FAX unit 505; a storage unit 506; an operation unit 507; and a NFC Reader/Writer (R/W) unit 508.

The controller 501 may be configured as a general-purpose computer. The controller 501 may include, for example, a CPU 509; a RAM 510; a ROM 511; an external I/F unit 512; an operation I/F unit 513; a NFC I/F unit 514; a BLE communication unit 515; and a network I/F unit 516, which are connected mutually through a bus 517.

The CPU 509 is a processor for implementing functions of the image processing apparatus 104 by reading out one or more programs and data stored in the ROM 511 and/or the storage unit 506, writing the read one or more programs and data in the RAM 510, and executing one or more processes. The RAM 510 is a volatile memory that is used as a work area of the CPU 509. The ROM 511 is a non-volatile memory for maintaining one or more programs and data, even if a power supply of the image processing apparatus 104 is turned off. The ROM 511 may be formed of a flash ROM, for example.

The external I/F unit 512 is an interface with an external device. Examples of the external device includes a recording medium, such as a USB memory, a memory card, and an optical disk; and various types of electronic devices. The operation I/F unit 513 is an interface for connecting the operation unit 507 to the controller 501. The NFC I/F unit 514 is an interface for connecting the NFC R/W unit 508 to the controller 501. Here, the NFC R/W unit 508 is for reading and writing data for an NFC device through the NFC communication.

The BLE communication unit 515 is a radio communication unit for executing short range radio communication based on the BLE. The network I/F unit 516 is a communication interface for connecting the image processing apparatus 104 to the network 105, and for transmitting data to and receiving data from the relay server 101 that is connected to the network 105. The above-described components are mutually connected through the bus 517. The bus 517 may transmit an address signal, a data signal, and various types of control signals, for example.

The image reading unit 502 may be, for example, a scanner engine for reading an image of a document, in accordance with the control of the image processing/engine controller 504. The plotter unit 503 may be, for example, a printer engine for outputting an image on a paper sheet, in accordance with the control of the image processing/engine controller 504. The image processing/engine controller 504 executes image processing by controlling the image reading unit 502 and the plotter unit 503.

The FAX unit 505 may include, for example, a hardware engine for executing facsimile transmission and reception, and a controller of the hardware engine. The storage unit 506 is a storage device, such as a HDD and a SSD. The storage device 506 may store various types of information and data, such as an OS, an application, and image data.

The operation unit 507 is an input unit for receiving an input operation from a user, and at the same time, the operation unit 507 is a display unit for displaying information for the user. Note that, in the example of FIG. 4, the operation unit 507 includes the NFC R/W unit 508 for reading and writing data for the NFC device by the NFC communication. The configuration of FIG. 5 is for exemplifying purposes only. The NFC R/W unit 508 may be provided separately from the operation unit.

As the MFP 104 depicted in FIG. 5, the image processing apparatus 104 according to the embodiment may include, for example, a configuration as a computer; and an image processing engine for implementing an image processing function of the image processing apparatus 104.

<Functional Configuration>

Figure 6:
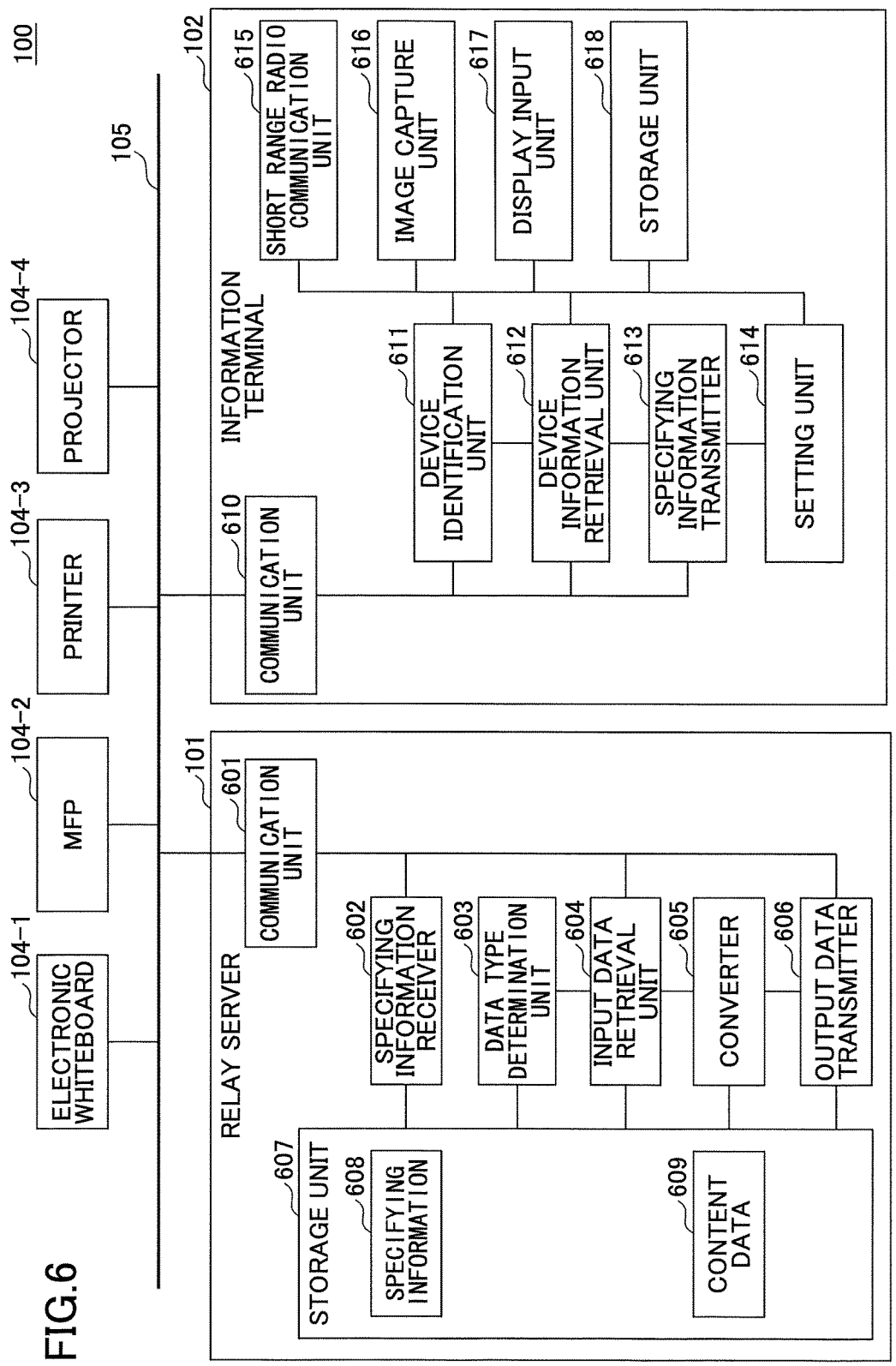
FIG. 6 is a functional configuration diagram of an example of the image processing system according to the embodiment.

FIG. 6 is a diagram illustrating a functional configuration of the image processing system 100 according to the embodiment. The image processing system 100 may include, as examples of the relay server 101, the information terminal 102, and the at least one image processing apparatus 104, the electronic whiteboard 104-1; the MFP 104-2; the printer 104-3; and the projector 104-4, for example. Here, the depiction of the access point 103 is omitted because the access point 103 does not affect the functional configuration of the embodiment.

(Functional Configuration of the Relay Server)

The relay server 101 may include a communication unit 601; a specifying information receiver 602; a data type determination unit 603; an input data retrieval unit 604; a converter 605; an output data transmitter 606; and a storage unit 607.

The communication unit 601 is a unit for connecting the relay server 101 to the network 105, and for implementing data communication with the information terminal 102 and the at lest one image processing apparatus 104. The communication unit 601 may be implemented by the network I/F unit 305 of FIG. 3, for example.

The specifying information receiver 602 receives, from the information terminal 102, specifying information for specifying, from the at least one image processing apparatus 104, the image processing apparatus 104 for inputting and the image processing apparatus 104 for outputting. The specifying information receiver 602 may preferably store the received specifying information in the storage unit 607 as the specifying information 608.

The data type determination unit 603 determines a data type of the input data obtained from the image processing apparatus 104 for inputting, based on the information on the data type that can be used for the image processing apparatus 104 for inputting, and the information on the data type that can be used for the image processing apparatus 104 for outputting, which are included in the specifying information 608. The specific determination method is described below.

The input data retrieval unit 604 obtains the input data from the image processing apparatus 104 for inputting, based on the specifying information received, by the specifying information receiver 602, from the information terminal 102. For example, the input data receiver 604 obtains, from the image processing apparatus 104 for inputting that is specified by the specifying information, the input data in the data type determined by the data type determination unit 603. The input data retrieval unit 604 may preferably store the obtained input data in the storage unit 607 as content data 609.

The converter 605 converts, based on the information on the data type that can be processed by the image processing apparatus 104 for outputting, which is included in the specifying information 608, the content data (the input data) 609 obtained by the input data retrieval unit 604 into data in the data type that can be processed by the image processing apparatus 104 for outputting. Note that, if the content data 609 obtained by the input data retrieval unit 604 can be processed by the image processing apparatus 104 for outputting as it is, the converter 605 may not convert the data type of the content data 609.

The output data transmitter 606 outputs, based on the specifying information 608 received by the specifying information receiver 602, output data based on the input data obtained by the input data retrieval unit 604 to the image processing apparatus 104 for outputting. For example, if the image processing apparatus 104 for outputting can process the data type of the input data obtained by the input data retrieval unit 604, the output data transmitter 606 transmits the input data obtained by the input data retrieval unit 604 to the image processing apparatus 104 for outputting. Further, if the image processing apparatus 104 for outputting may not process the data type of the input data, the output data transmitter 606 transmits, to the image processing apparatus 104 for outputting, the image data that is converted, by the converter 605, into the image data in the data type that can be processed by the image processing apparatus 104 for outputting.

Note that the above-described specifying information receiver 602, the data type determination unit 603, the input data retrieval unit 604, the converter 605, and the output data transmitter 606 can be implemented by an image processing program executed by the CPU 301 of FIG. 3, for example.

The storage unit 607 may be, for example, a device for storing various types of information and data, such as the specifying information 608 that is received by the specifying information receiver 602, and the content data 609 that is obtained by the input data retrieval unit 604. The storage unit 607 can be implemented, for example, by a storage device, such as the RAM 302 and/or the storage unit 304 of FIG. 3, and one or more programs executed by the CPU 301.

(Functional Configuration of the Information Terminal)

The information terminal 102 may include a communication unit 610; a device identification unit 611; a device information retrieval unit 612; a specifying information transmitter 613; a setting unit 614; a short range radio communication unit 615; an image capture unit 616; a display input unit 617; and a storage unit 618.

The communication unit 601 is for connecting the information terminal 102 to the network 105, and for executing data communication with the relay server 101 and the at least one image processing apparatus 601. The communication unit 601 may be implemented, for example, by the network I/F unit 408 of FIG. 4.

The device identification unit 611 is for identifying, from the at least one image processing apparatus 104, the image processing apparatus 104 for inputting and the image processing apparatus 104 for outputting, based on a user's operation, for example. The device identification unit 611 can cause the display unit 617 to display a device identification screen. The device identification unit 611 identifies, by using, for example, the information received by the display input unit 617, the information obtained by the short range radio communication unit 615, or the information captured by the image capture unit 617, the image processing apparatus 104 for inputting and the image processing apparatus 104 for outputting.

The device information retrieval unit 612 obtains, from the image processing apparatus 104 for inputting that is identified by the device identification unit 611, the device information (capability information). Further, the device information retrieval unit 612 obtains the device information from the image processing apparatus 104 for outputting that is identified by the device identification unit 611. The device information is described below.

The specifying information transmitter 613 transmits, to the relay server 101, the specifying information that is identified by the device identification unit 611 and that specifies, from the at least one image processing apparatus 104, the image processing apparatus 104 for inputting and the image processing apparatus 104 for outputting. The specifying information includes address information, such as an IP address, a host name, or a MAC address of the image processing apparatus 104 for inputting, and an IP address, a host name, or a MAC address of the image processing apparatus 104 for outputting. In the embodiment, the specifying information includes the device information of the image processing apparatus 104 for inputting and the device information of the image processing apparatus 104 for outputting, which are obtained by the device information retrieval unit 612.

In response to detecting that at least one of the device information of the image processing apparatus 104 for inputting and the device information of the image processing apparatus 104 for outputting includes setting information for setting the device, the setting unit 614 receives an input for changing the setting information from a user through the display input unit 617.

Here, the device identification unit 611, the device information retrieval unit 612, the specifying information transmitter 613, and the setting unit 614 may be implemented by one or more programs executed by the CPU 401 of FIG. 4, for example.

The short range radio communication unit 615 is for executing short range radio communication, such as the NFC communication and the BLE communication, with the image processing apparatus 104. The short range radio communication unit 615 can be implemented by the NFC communication unit 406 and/or the BLE communication unit 407, for example.

The image capture unit 616 is for capturing image of a bar code or a two-dimensional code corresponding to the image processing apparatus 104. The image capture unit 616 can be implemented by the camera unit 405, for example.

The display input unit 617 is for displaying the device identification screen and the setting screen, and at the same time, for receiving a user's operation, for example. The display input unit 617 can be implemented, for example, by the display input unit 409 of FIG. 4 and one or more programs executed by the CPU 401.

The storage unit 618 is for storing various types of information and data including, for example, device information of the image processing apparatus 104 obtained by the device information retrieval unit 612. The storage unit 618 can be implemented, for example, by the storage device, such as the RAM 402 and the storage unit 404 of FIG. 4, and one or more programs executed by the CPU 401.

<Flow of the Process>

(Flow of the Image Processing)

Figure 7:
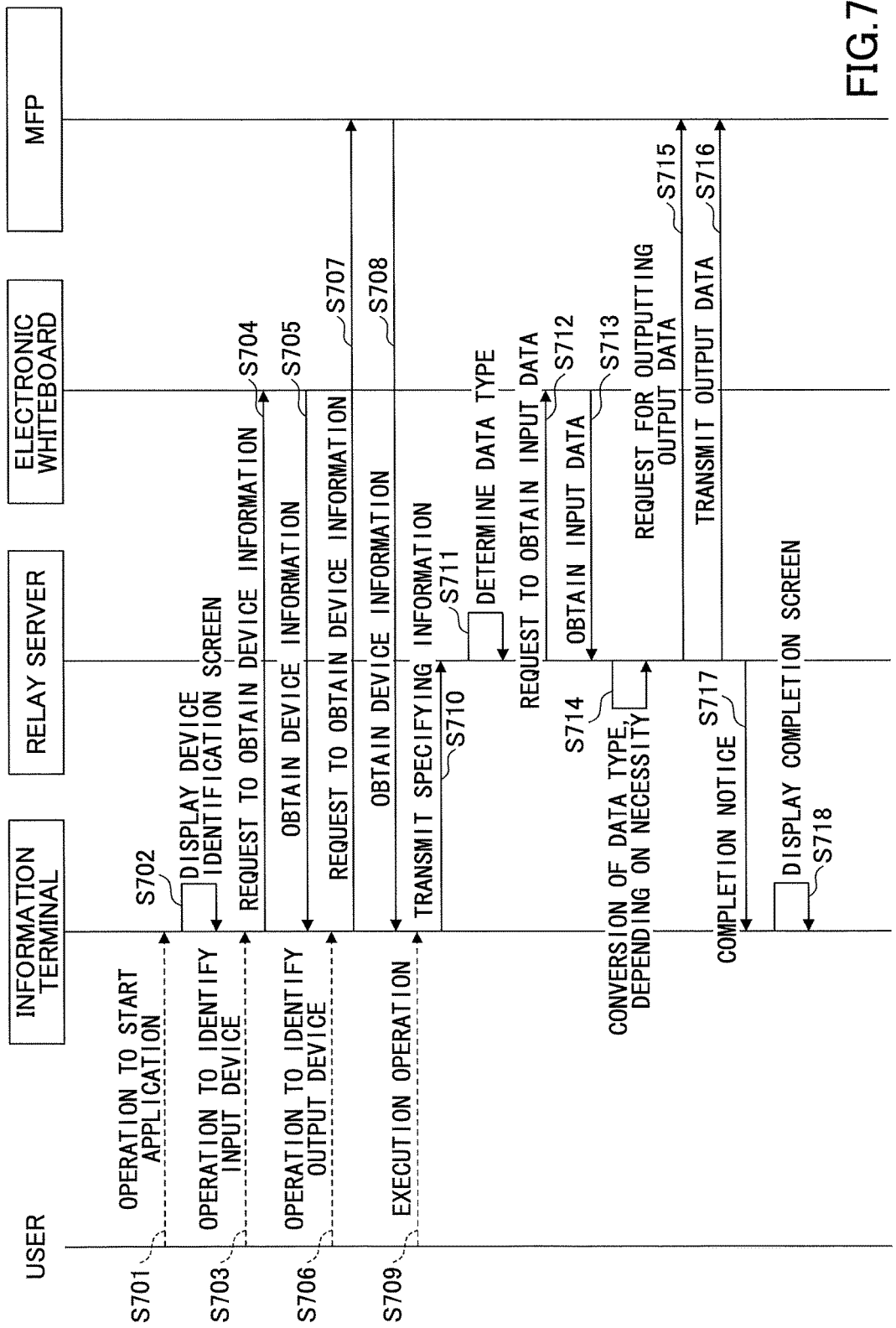
FIG. 7 is a sequence chart illustrating an example of image processing according to the embodiment.

FIG. 7 is a sequence chart illustrating an example of image processing according to the embodiment. Note that, in FIG. 7, the arrows indicated by the dashed lines indicate operations on the information terminal 102 by the user.

At step S701, upon detecting an operation, by the user, to start an application, which is installed in the information terminal 102, for the image processing system 100 (an image processing program), the image processing system 100 starts image processing.

At step S702, upon receiving the operation to start the application, the information terminal 102 causes the display input unit 617 to display the device identification screen for prompting the user to specify the image processing apparatus 104 for inputting (which is referred to as the input device, hereinafter) and the image processing apparatus 104 for outputting (which is referred to as the output device, hereinafter).

At step S703, a user performs an operation to specify the input device (specifying operation), in accordance with the device identification screen displayed on the display input unit 617 of the information terminal 102.

Figure 8:
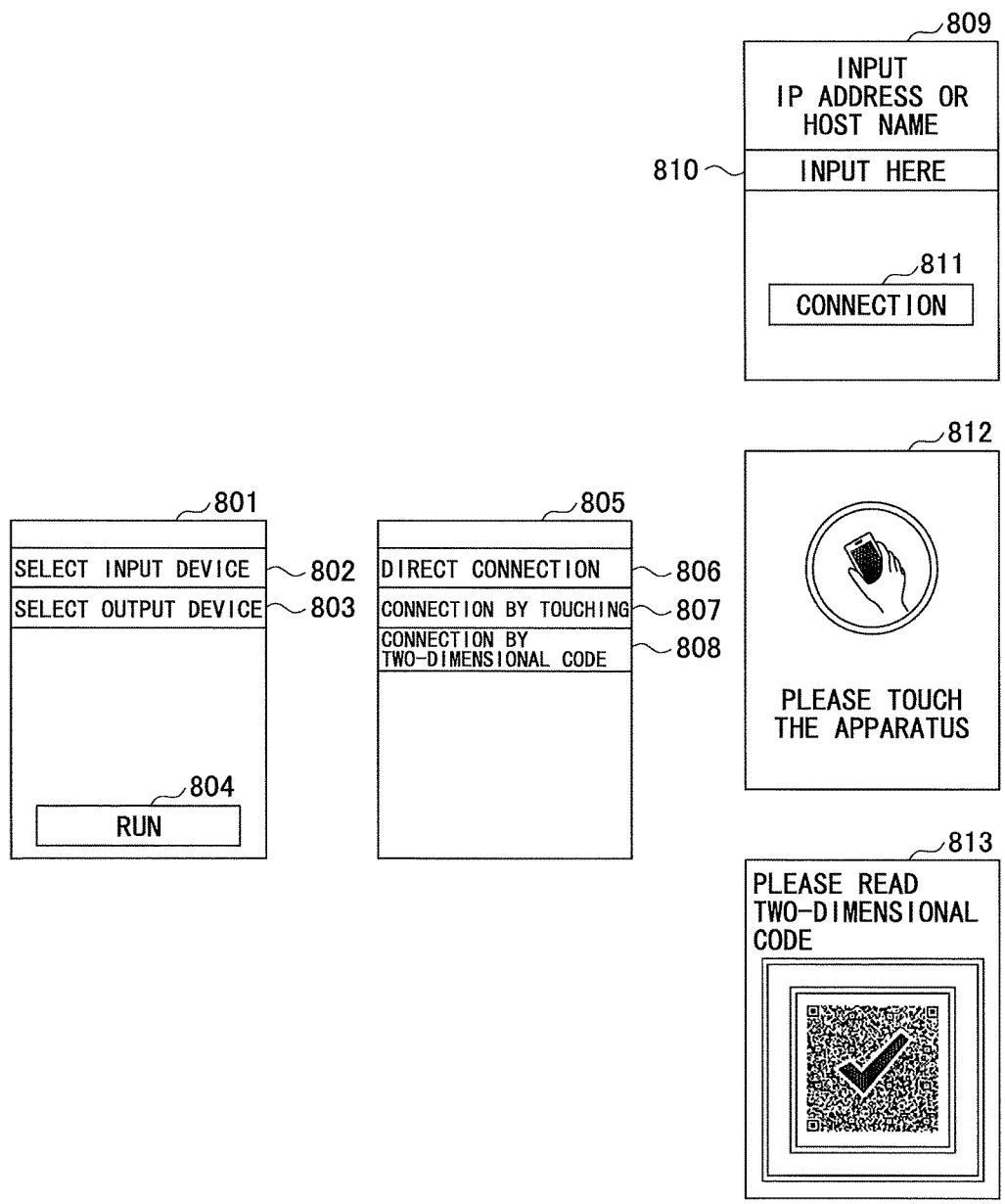
FIG. 8 is a diagram illustrating an example of a device identification screen according to the embodiment.

FIG. 8 is a diagram illustrating an example of a device identification screen 801 according to the embodiment. At step S702 of FIG. 7, the information terminal 102 causes the display input unit 617 to display the device identification screen 801, which is illustrated in FIG. 8, for example. The device identification screen 801 includes, for example, a select input device button 802 for selecting the input device, a select output device button 803 for selecting the output device, and a run button 804.

In response to detecting that the select input button 802 or the select output button 803 is pressed (tapped) at the device identification screen 801, a selection method specifying screen 805 depicted in FIG. 8 is displayed on the display input unit 617, for example. The selection method specifying screen 805 may include, for example, a direct connection button 806, a connection by touching button 807, and a connection by two-dimensional code button 808. The user can specify the method of selecting the input device or the output device in the selection method specifying screen 805.

For example, upon detecting that the direct connection button 806 is pressed in the selection method specifying screen 805 of FIG. 8, the information terminal 102 causes the display input unit 617 to display a destination setting screen 809, such as the screen depicted in FIG. 8. In the destination setting screen 809 of FIG. 8, the user inputs, to an input screen 810, the IP address, the host name, or the MAC address of the image processing apparatus 104 that is desired to be used as the input device (or the output device), and the user presses a connection button 811. In this manner, the user can specify the image processing apparatus 104 that is used as the input device (or the output device).

In response to detecting that the connection by touching button 807 is pressed in the selection method specifying screen 805 of FIG. 8, the information terminal 102 causes the display input unit 617 to display a message screen 812 as depicted in FIG. 8. During the time period in which the message screen 812 is displayed, the information terminal 102 transitions to a mode were a radio wave of the NFC communication, for example, is detected by the short range radio communication unit 615. Upon detecting that the information terminal 102 approaches the specified image processing apparatus 104, the information terminal 102 causes the short range radio communication unit 615 to obtain, from the image processing apparatus 104, address information (network information), such as the IP address, the host name, or the MAC address of the image processing apparatus 104.

Note that, at this time, the short range radio communication unit 615 may obtain, in addition to the address information of the image processing apparatus 104, the device information, which is described below. Additionally, the information terminal 102 may obtain information from the image processing apparatus 104 by using a short range radio communication scheme other than the NFC-based communication scheme, such as the BLE-based communication scheme.

Further, upon detecting that the connection by two-dimensional code button 808 is pressed in the selection method specifying screen 805 of FIG. 8, the information terminal 102 causes the display input unit 617 to display a two-dimensional code reading screen 813, such as the screen shown in FIG. 8, for example. In response to detecting that, in this state, an image of the two-dimensional code is captured by the image capture unit 616, the device identification unit 611 obtains the destination information of the image processing apparatus 104, which is embedded in the two-dimensional code. Here, in the two-dimensional code, not only the destination information, but also the device information, which is described below, may be embedded.

Here, referring back to FIG. 7, the description of the sequence chart is continued.

At step S704, the information terminal 102 transmits a request to obtain device information to the input device that is identified (specified) at step S703 (e.g., the electronic whiteboard 104-1).

At step S705, the information terminal 102 obtains the device information transmitted from the input device to which the request to obtain the device information is transmitted (e.g., from the electronic whiteboard 104-1).

At step S706, the user performs an operation to identify the output device in the device identification screen 801, which is displayed on the display input unit 617 of the information terminal 102. Here, the operation to identify the output device is the same as the above-described operation to identify the input device.

At step S707, the information terminal 102 transmits a request to obtain the device information to the output device that is identified (specified) at step S706 (e.g., the MFP 104-2).

At step S708, the information terminal 102 obtains the device information from the output device to which the request to obtain the device information is transmitted (e.g., from the MFP 104-2).

FIG. 9 is a diagram illustrating an example of the device information according to the embodiment. The device information (the capability information) 901 may include information, such as "type," "input," and "output."

The "type" information indicates a type of the image processing apparatus 104, such as the electronic whiteboard (whiteboard), the MFP (mfp), and the projector (projector).

The "input" information indicates a specification for inputting a content (input data). The device information of the device that does not support the input may not include the "input" information. Similarly, the "output" information indicates a specification for outputting a content (output data). The device information of the device that does not support the output may not include the "output" information.

Additionally, the "input" information and the "output" information may include "mime_type" information and "settings" information, for example.

The "mime_type" information is list information of types of a content (data types) that can be processed by the image processing apparatus 104. The "settings" information indicates available setting parameters, and ranges in which the setting parameters can be set.

In the example of the device information 901 that is illustrated in FIG. 9, it is described that the image processing apparatus 104 is a MFP, and that PDF (application/pdf) or JPEG (image/jpeg) can be used as the data type of the input (scan) image. Additionally, it is described that a color mode (color_mode), a resolution (resolution) and a surface of a document (2 sided) can be specified as the setting of the image processing apparatus 104 during the input.

Additionally, it is described that the image processing apparatus 104 can use PDF (application/pdf) and Postscript (application/postscript) as output (print) image data types. Furthermore, it is described that a color mode (color_mode), a resolution (resolution), a side of a document (2 sided), double-sided printing (nup), and a number of copies (copies) can be specified as the setting of the image processing apparatus 104 during the output.

Referring back to FIG. 7, the description of the sequence chart is continued.

At step S709 of FIG. 7, the user performs an execution operation to request execution of image processing from the information terminal 102, for example, by pressing the run button 804 included in the device identification screen 801 of the display input unit 617 of the information terminal 102.

Note that, if it is determined that the "settings" information is included in the device information that is obtained from the input device and the output device, the setting screen can be displayed in the information terminal 102, prior to the execution operation at step S709, to change the setting parameters.

FIG. 10 is a diagram illustrating an example of the setting screen 1001 according to the embodiment. In the example of FIG. 10, the setting screen 1001 may include a setting field 1002 for setting "color mode," a setting field 1003 for setting "resolution," a setting field 1004 for setting "surface of document," a setting field 1005 for setting "layout," and a setting field 1006 for setting "number of copies." The user can change the setting value by tapping the corresponding setting field.

For example, upon detecting that the setting field 1002 for the "color mode" in the setting screen 1001 is tapped by the user, a setting screen 1007 for setting the color mode is displayed on the display input unit 617. In the setting screen 1007 for the color mode, for example, a setting button 1008 for setting the "color," and a setting button 1009 for setting the "monochrome" are displayed, so that the user can select the color mode by tapping one of the setting button 1008 and the setting button 1009. After completing the setting, the user can return to the device identification screen 801 of FIG. 8 by swiping the setting screen 1001, for example.

Referring back to FIG. 7, the description of the sequence chart is continued.

At step S709 of FIG. 7, upon detecting that the execution operation for executing image processing is input to the information terminal 102, the information terminal 102 transmits the specifying information to the relay server 101 (step S710).

FIG. 11 is a diagram illustrating the specification information according to the embodiment. In the specification information 1101, the information on the input device and the information on the output device are specified.

In FIG. 11, the information on the input device (input) includes information items, such as the type of the image processing apparatus (type), the destination information (host), the information on the available data type (mime_type), and the setting information (settings). Similarly, the information on the output device (output) includes information items, such as the type of the image processing apparatus (type), the destination information (host), the information on the available data type (mime_type), and the setting information (settings).

In the example of FIG. 11, the electronic whiteboard 104-1 (IP address: 192.168.1.11; available data type: JPEG, TIFF; setting: none) is specified as the input device in the specifying information 1101. In addition, the MFP 104-2 (IP address: 192.168.1.12; available data type: PDF, Postscript; setting: color, 200 dpi, single-side printing, 2 in 1, two copies) is specified as the output device in the specifying information 1101.

Referring back to FIG. 7, the description of the sequence chart is continued.

At Step S711, the data type determination unit 603 of the relay server 101 determined the data type of the input data based on the information on the data type that can be processed in the image processing apparatus 104 for inputting, and the information on the data type that can be processed in the image processing apparatus 104 for outputting, which are included in the specifying information.

At step S712, the input data retrieval unit 604 of the relay server 101 requests to obtain the input data in the data type determined by the data type determination unit 603 from the input device (the electronic whiteboard 104-1).

At step S713, the input data retrieval unit 604 of the relay server 101 obtains input data from the input device, and the input data retrieval unit 604 stores the obtained input data in the storage unit 607 as the content data 609, for example.

At step S714, depending on necessity, the converter 605 of the relay server 101 converts the content data 609 obtained by the input data retrieval unit 604 into data in the data type that can be processed by the output device (the MFP 104-2).

FIG. 12 is a diagram illustrating an example of a convertible list according to the embodiment. In the convertible list 1201, information on the data types that can be converted by the convertor 605 is described. In the example of FIG. 12, it is indicated that the convertor 605 can support conversion from JPEG to PFD, conversion from MSWORD to PDF, and conversion from PDF to JPEG.

At step S715 of FIG. 7, the output data transmitter 606 of the relay server 101 transmits a request for outputting output data to the output device (the MFP 104-2), and subsequently the output data transmitter 606 transmits the output data to the output device at step S716.

At step S717, the relay server 101 transmits, to the information terminal 102, a completion notice indicating that the image processing is completed. At step S718, the information terminal 102 that receives the completion notice causes the display input unit 617 to display a completion screen.

By the above-described process, the output data that is based on the input data obtained from the input device (the electronic whiteboard 104-1) can be output to the output device (the MFP 104-2). Additionally, at this time, the input data and the output data are not stored in the information terminal 102, so that the input data and the output data can be prevented from being leaked.

Here, the determination process and the conversion process of steps from S711 to S714 of FIG. 7 are described in detail.

(Determination Process and Conversion Process)

FIG. 13 is a flowchart illustrating the determination process and the conversion process of the data type according to the embodiment.

At step S1301, the relay server 101 determines whether the mime_type of the input device (the image processing apparatus 104 for inputting) and the mime_type of the output device (the image processing apparatus 104 for outputting) are the same, based on the specifying information received from the information terminal 102, for example. In this manner, the relay server 101 determines whether there is a data type that can be processed by both the input device and the output device.

In response to detecting, at step S1301, that there is a mime_type in common with the input device and the output device, the relay server 101 obtains the input data in the detected mime_type from the input device (step S1302). For example, in response to detecting that the input device and the output device support the same mime_type "JPEG," the relay server 101 transmits, to the input device, a request 1401 for obtaining the input data, such as the request depicted in FIG. 14A. In the example of FIG. 14A, the request 1401 for obtaining the input data includes information specifying the JPEG format, as the data type of the input data.

The input device that receives the request for obtaining the input data obtains image data in the JPEG format, which is the specified mime_type; and the input device transmits the obtained image data to the relay server 101. Further, the relay server 101 causes the output device to output the obtained data in the JPEG format (step S1303), for example. Namely, in response to detecting that there is a data type that can be processed by both the input device and the output device, the relay server 101 causes the output device to output the data without converting the data type.

Whereas, in response to detecting, at step S1301, that there is no mime_type that is in common with the input device and the output device, the relay server 101 determines whether there is a combination of the mime_type of the input device and the mime_type of the output device such that the mime_type of the input device can be converted into the mime_type of the output device (step S1304). The relay server 101 obtains the convertible list that is illustrated in FIG. 12 from the converter 605, and the relay server 101 determines whether there is a combination of the mime_type of the input device and the mime_type of the output device such that the mime_type of the input device can be converted into the mime_type of the output device.

In response to detecting, at step S1304, that there is no combination of the mime_type of the input device and the mime_type of the output device such that the mime_type of the input device can be converted into the mime_type of the output device, the process proceeds to step S1305. At step S1305, the relay server 101 repots the conversion error to the information terminal 102 (step S305), and the process ends.

Whereas, in response to detecting, at step S1304, that there a combination of the mime_type of the input device and the mime_type of the output device such that the mime_type of the input device can be converted into the mime_type of the output device, the process from steps S1306 to S1308 is executed.

At step S1306, the relay server 101 obtains the data in the convertible mime_type from the input device.

At step S1307, the relay server 101 converts the obtained data into data in a mime_type that can be processed by the output device.

At step S1308, the relay server 101 causes the output device to output the converted data in the mime_type that can be processed by the output device. For example, after transmitting a request 1402 for outputting the output data, such as the request illustrated in FIG. 14B, to the output device, the relay server 101 transmits the output data to the output device. The example of FIG. 14B indicates that the output device receives the output data in the PDF format from the relay server 101, and the output device executes image processing (e.g., printing) with settings of the color mode, 200 dpi, the single-side printing, 2 in 1, and two copies.

As described above, the relay server 101 according to the embodiment obtains, based on the specifying information that is received from the information terminal 102, the input data from the image processing apparatus 104 for inputting, and the relay server 101 causes the image processing apparatus 104 for outputting to output the output data, which is based on the obtained input data. Thus, the information terminal 102 can control image processing by the plurality of image processing apparatuses 104, without storing, in the information terminal 102, the image data to be processed.

In this manner, the image processing system 100 can be provided that makes it easier to control, by using the information terminal 102, such as a smart device, image processing that is to be executed by the plurality of image processing apparatuses 104-1 to 104-4, while preventing information of the data to be processed from being leaked.

[Another Embodiment]

In the above-described embodiment, the execution operation (step S709) is made, after identifying (specifying) the input device and the output device at step S703 to step S708 of FIG. 7, for example. However, the image processing apparatus 104 for inputting and the image processing apparatus 104 for outputting can be separately specified.

<Functional Configuration>

FIG. 15 is a diagram illustrating an example of the functional configuration of the image processing system 100 according to the embodiment. In FIG. 15, the relay server 101 includes, in addition to the functional configuration of the above-described embodiment, which is depicted in FIG. 6, an identifier reporting unit 1501. Here, the differences from the configuration of the image processing system 100 according to the above-described embodiment are mainly described. The other configuration of the image processing system 100 according to this embodiment is the same as the configuration of the image processing system 100 according to the above-described embodiment.

In response to detecting that the specifying information for specifying the image processing apparatus 104 for inputting is received from the information terminal 102, the identifier reporting unit 1501 associates the received specifying information with an identifier (ticket) for identifying the current process, and the identifier reporting unit 1501 stores the received specifying information and the associated identifier in the storage unit 607, as input device information 1502. Further, the identifier reporting unit 1501 reports (transmits) the identifier for identifying the current process to the information terminal 102 that transmits the specifying information.

<Flow of the Process>

Figure 16:
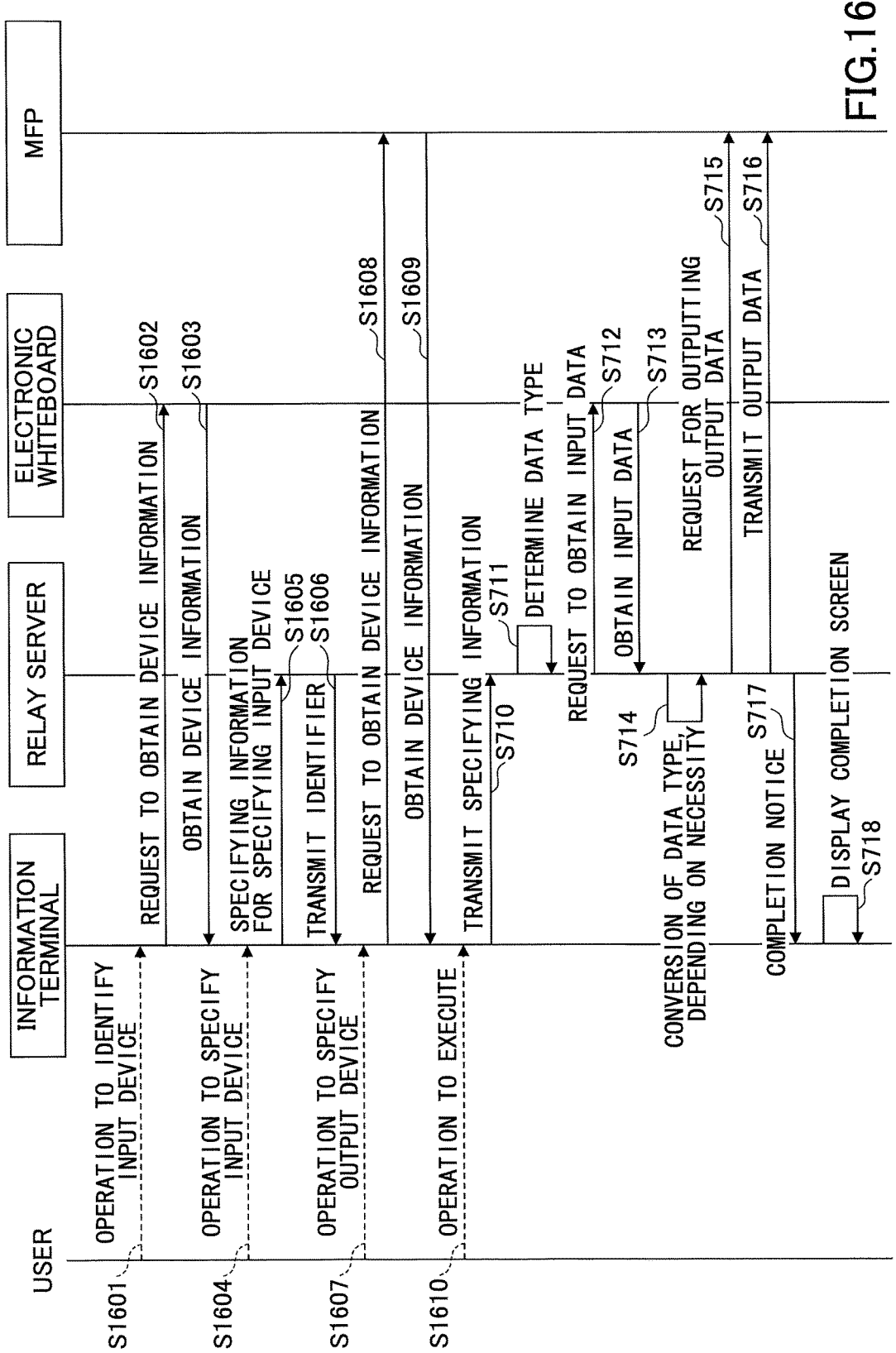
FIG. 16 is a sequence chart illustrating an example of the image processing according to the other embodiment.

FIG. 16 is a sequence chart illustrating an example of image processing according to the embodiment.

At step S1601, similar to the above-described embodiment, a user performs an operation to specify the input device (specifying operation), in accordance with the device identification screen displayed on the display input unit 617 of the information terminal 102.

At step S1602, similar to the above-described embodiment, the information terminal 102 transmits a request to obtain device information to the image processing apparatus 104 for inputting that is identified at step S1601, such as the electronic whiteboard 104-1.

At step S1603, similar to the above-described embodiment, the information terminal 102 obtains the device information from the image processing apparatus 104 for inputting to which the request to obtain the device information is transmitted, such as the electronic whiteboard 104-1.

At step S1604, in the embodiment, the user performs the operation to specify the input device, without performing the operation to identify the output device. For example, the user performs the operation to specify the input device by pressing the run button 804 in the device identification screen 801 of FIG. 8, without selecting the output device.

At step S1605, the information terminal 102, which receives the operation to specify the input device from the user, transmits, to the relay server 101, specifying information 1701 for specifying the input device, such as the specifying information 1701 illustrated in FIG. 17A. Compared with the specifying information 1104 according to the above-described embodiment, the specifying information 1701 for specifying the input device does not include the item of "output."

In response to detecting, at step S1606, that the specifying information 1701 for specifying the input device is received from the information terminal 102, the relay server 101 transmits, to the information terminal 102, identification information 1702 for identifying the process, such as the information illustrated in FIG. 17B. In addition, at this time, the relay server 101 associates the information of the input device, which is included in the specifying information that is received from the information terminal 102 and that is for specifying the input device, with the identification information 1702 for identifying the process, which is transmitted to the information terminal 102. Then, the relay server 101 stores, in the storage unit 607, the information of the input device and the associated identification information 1702 for identifying the process, as the input device information 1502. At this time, the relay server 101 may not obtain the input data from the input device. Note that the identification reporting unit 1501 creates, for each process, a unique value, as the value of the "ticket" included in the identification information 1702 of this process, for example.

At step S1607, the user performs the operation to identify the output device, in accordance with the device identification screen displayed on the display input unit 617 of the information terminal 102. Here, the operation to identify the output device may be performed, for example, immediately after the operation to specify the input device, as illustrated in FIG. 16. Alternatively, the operation to identify the output device may be performed later.

At step S1608, the information terminal 102 transmits a request to obtain the device information to the output device that is identified at step S1607, such as the MFP 104-2.

At step S1609, the information terminal 102 obtains the device information from the output device, such as the MFP 104-2, to which the request to obtain the device information is transmitted.

In response to detecting, at step S1610, that the operation to execute image processing is received from the user, the image processing system 100 executes image processing based on the received specifying information (steps S710 to S718), similar to the above-described embodiment.

FIG. 18 illustrates an example of the specifying information 1801 that is transmitted from the information terminal 102 to the relay server 101 at this time. The specifying information 1801 according to the embodiment includes the item "ticket," instead of the item "input" in the specifying information 1101, which is illustrated in FIG. 11, of the above-described embodiment. The item "ticket" is included in the identification information 1702 for identifying the process, and the identification information 1702 is reported from the relay server 101 at step S1606.

The relay server 101 can identify the device information of the input device, based on the item "ticket" included in the specifying information 1801 and the input device information 1502 stored in the storage unit 607.

By the above-described process, the user can specify the input device and the output device at different timings, thereby enhancing the convenience of the image processing system 100.

[Further Embodiment]

In this embodiment, an example of a case is described where at least one image processing apparatus 104 is pre-registered in the relay server 101.

<Functional Configuration>

Figure 19:
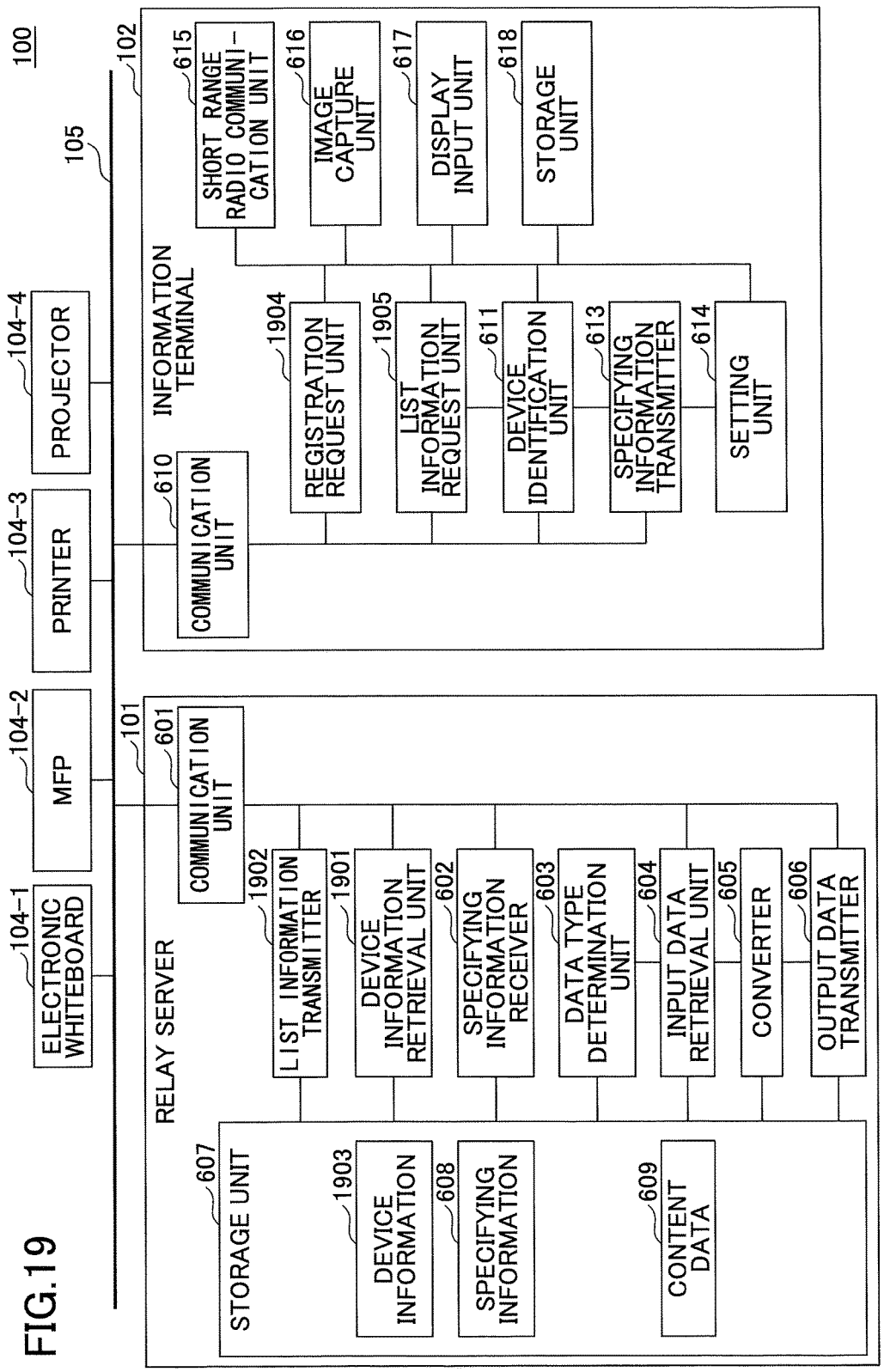
FIG. 19 is a diagram illustrating an example of the functional configuration of the image processing system according to a further embodiment.

FIG. 19 is a diagram showing an example of the functional configuration of the image processing system 100 according to this embodiment.

(Functional Configuration of the Relay Server)

The relay server 101 according to the embodiment includes, in addition to the configuration of the relay server 101 according to the above-described embodiment, which is illustrated in FIG. 6, a device information retrieval unit 1901; and a list information transmitter 1902. Here, the differences from the configuration of the image processing system 100 according to the above-described embodiment are mainly described because the other configuration of the image processing system 100 according to this embodiment is the same as the configuration of the image processing system 100 according to the above-described embodiment.

The device information retrieval unit 1901 obtains, from the input device, the device information of the input device; and the device information retrieval unit 1901 obtains, from the output device, the device information of the output device. Further, the device information retrieval unit 1901 stores, for example, the obtained device information in the storage unit 607, as device information 1903.

In response to receiving a request from the information terminal 102, for example, the list information transmitter 1902 transmits list information of the at least one image processing apparatus 104, which is stored as the device information 1903, to the information terminal 102.

Here, the device information retrieval unit 1901 and the list information transmitter 1902 can be implemented, for example, by one or more programs executed by the CPU 301 of FIG. 3.

(Functional configuration of the information terminal) The information terminal 102 according to the embodiment includes, in addition to the configuration of the information terminal 102 according to the above-described embodiment, which is illustrated in FIG. 6, a registration request unit 1904; and a list information request unit 1905. The information terminal 102 according to the embodiment may not include the device information retrieval unit 612, which is included in the information terminal 102 according to the above-described embodiment. Here, the differences from the configuration of the image processing system 100 according to the above-described embodiment are mainly described because the other configuration of the image processing system 100 according to this embodiment is the same as the configuration of the image processing system 100 according to the above-described embodiment.

The registration request unit 1904 is a unit for requesting, from the relay server 101, a registration process for registering the image processing apparatus 104. The registration process for registering the image processing apparatus 104 is described below.

The list information request unit 1905 is a unit for requesting, from the relay server 101, the list information of the at least one image processing apparatus 104.

The registration request unit 1904 and the list information request unit 1905 can be implemented, for example, by one or more programs executed by the CPU 401.

Figure 20:
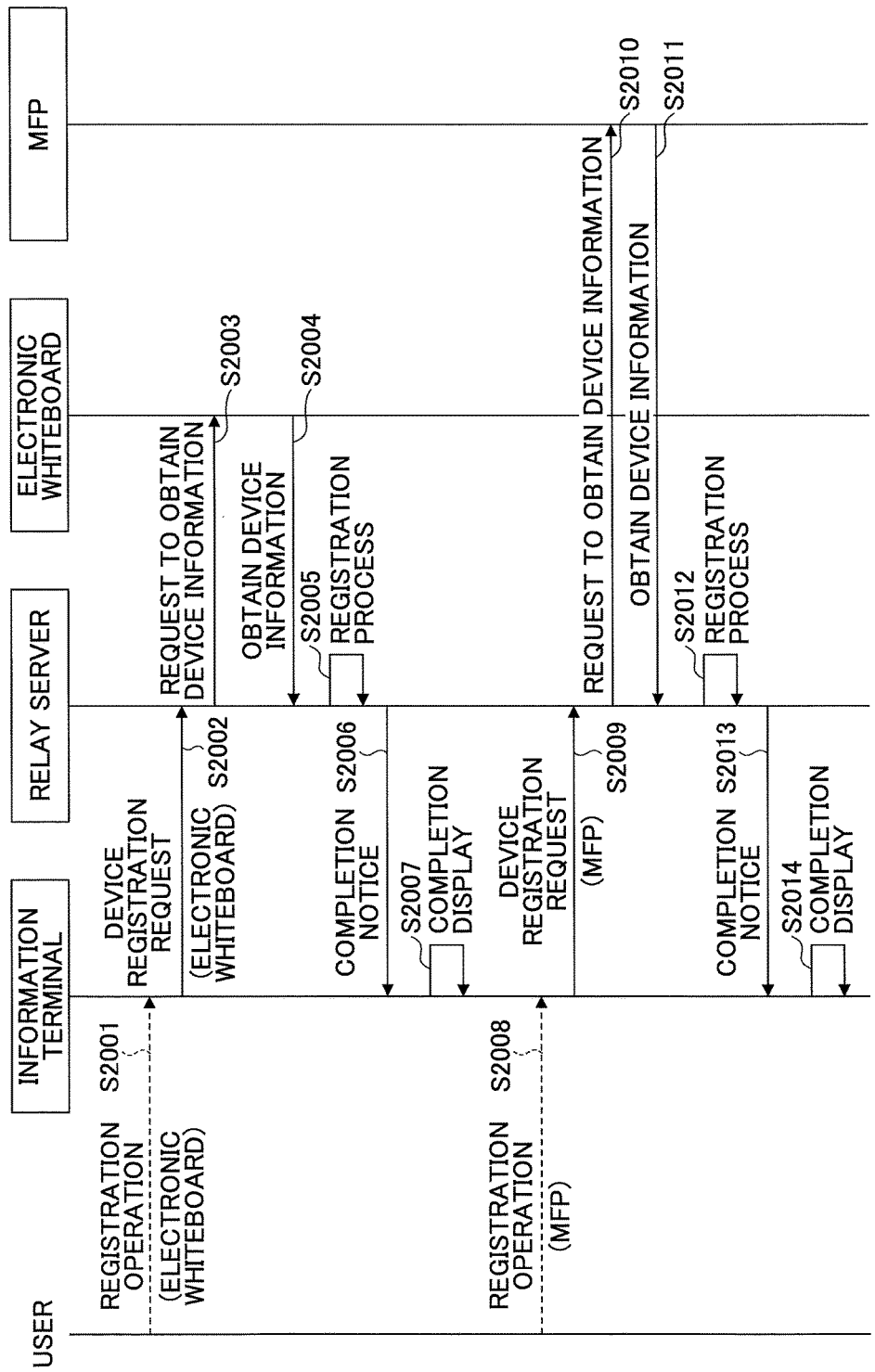
FIG. 20 is a sequence chart illustrating an example of a registration process according to the further embodiment.

<Flow of the Process>
(Registration Process)
FIG. 20 is a sequence chart illustrating an example of the registration process according to the embodiment.

At step S2001, the user performs an operation to register the image processing apparatus 104 that is desired to be registered, such as the electronic whiteboard 104-1. The operation for the registration may be performed, for example, by adding a selection button for selecting a device to be registered in the device identification screen 801 depicted in FIG. 8, and by pressing the selection button for selecting the device to be registered. In response to receiving, at step S2002, the operation for registering, for example, the electronic whiteboard 104-1 from the user, the information terminal 102 transmits, to the relay server 101, a device registration request for registering the electronic whiteboard 104-1 by using the registration request unit 1904.

In response to receiving, at step S2003, the device registration request form the information terminal 102, the relay server 101 transmits a request to obtain device information to the electronic whiteboard 104-1 by using the device information retrieval unit 1901.

At step S2004, the device information retrieval unit 1901 of the relay server 101 obtains the device information transmitted from the electronic whiteboard 104-1.

At step S2005, the device information retrieval unit 1901 of the relay server 101 registers the device information obtained from the electronic whiteboard 104-1 in the device information 1903 of the storage unit 607. At this time, the device information retrieval unit 1901 generates a unique device ID (e.g., "whiteboard 1") for the electronic whiteboard 104-1. Then, the device information retrieval unit 1901 associates the generated device ID with the obtained device information, and the device information retrieval unit 1901 registers the generated device ID and the associated device information in the device information 1903.

At step S2006, the relay server 101 reports to the information terminal 102 that the registration process is completed.

In response to receiving the completion notice at step S2007, the information terminal 102 displays, on the display input unit 617, information indicating that the registration process is completed.

Similarly, the user can register a plurality of image processing apparatuses 104.

For example, at step S2008, the user performs an operation to register the information processing apparatus 104, such as the MFP 104-2, which is desired to be registered, subsequently.

In response to receiving, at step S2009, the operation to register, for example, the MFP 104-2 from the user, the information terminal 102 transmits a request to register the MFP 104-2 to the relay server 101 by using the registration request unit 1904.

Upon receiving, at step S2010, the device registration request from the information terminal 102, the relay server 101 transmits a request to obtain device information to the MFP 104-2 by using the device information retrieval unit 1901.

At step S2011, the device information retrieval unit 1901 of the relay server 101 obtains the device information transmitted from the MFP 104-2.

At step S2012, the device information retrieval unit 1901 of the relay server 101 registers the device information obtained from the MFP 104-2 in the device information 1903 in the storage unit 607.

At this time, the device information retrieval unit 1901 generates a unique device ID (e.g., "mfp 1") for the MFP 104-2. Then, the device information retrieval unit 1901 associates the generated device ID with the obtained device information, and the device information retrieval unit 1901 registers the generated device ID and the associated device information in the device information 1903.

At step S2013, the relay server 101 reports to the information terminal 102 that the registration process is completed.

Upon receiving, at step S2007, the completion notice, the information terminal 102 displays, on the display input unit 617, information indicating that the registration process is completed.

(Image Processing)
FIG. 21 is a diagram illustrating an example of the image processing according to the embodiment.

At step S2101, a user performs, on the information terminal 102, an operation to display a list of available devices.

At step S2102, the list information request unit 1095 of the information terminal 102, which receives the operation to display the list of the devices from the user, transmits, to the relay server 101, a request to obtain list information.

At step S2103, the list information transmitter 1902 of the relay server 101, which receives the request to obtain the list information, transmits, to the information terminal 102, the list information of the at least one available image processing apparatus 104. Then, the information terminal 102 obtains the transmitted list information. FIG. 22 illustrates an example of the list information transmitted by the relay server 101 at this time. The list information 2201 includes, for example, the device information of the image processing apparatuses 104 that is registered at steps S2205 and S2012 of FIG. 20; and the device IDs that are unique to the corresponding image processing apparatuses 104.

In the example of FIG. 22, the list information 2201 includes the device information of the MFP 104-2, and the device ID "mfp 1" corresponding to the MFP 104-2. In addition, the list information 2201 includes the device information of the electronic whiteboard 104-1, and the device ID "whiteboard 1" corresponding to the electronic whiteboard 104-1.

Referring back to FIG. 21, the description of the sequence chart is continued.

Figure 23:
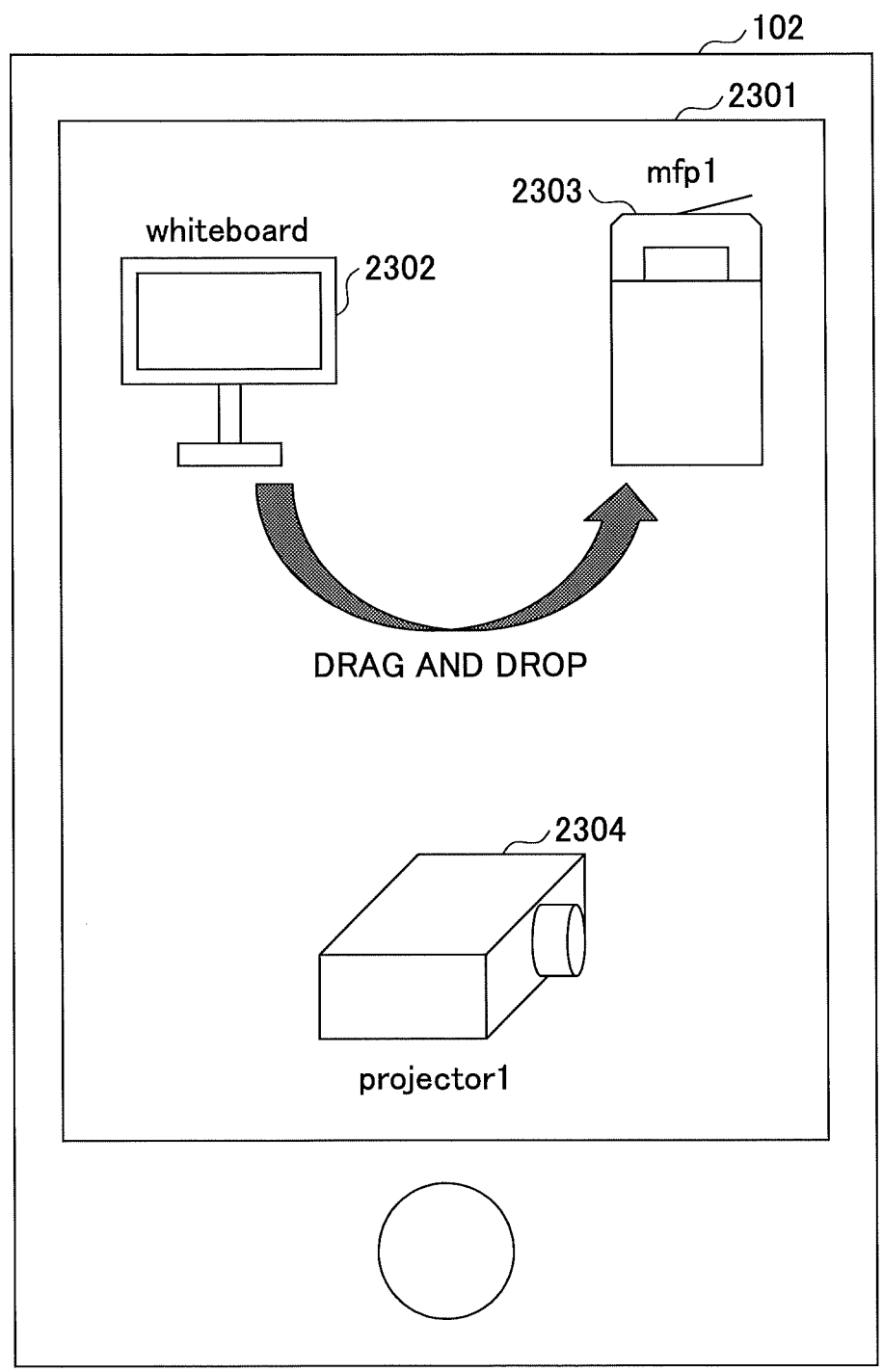
FIG. 23 is a diagram illustrating an example of a selection screen of an input/output device according to the further embodiment.

At step S2104, the information terminal 102 causes the display input unit 617 to display a selection screen for selecting an input device and/or an output device. The selection screen displays a list of the device ID of the at least one available image processing apparatus 104 and an icon of the device ID on a graphical user interface (GUI). FIG. 23 illustrates an example of the selection screen for selecting an input device and/or an output device, which is displayed on the display input unit 617, at this time.

In the example of FIG. 23, the selection screen 2301 for selecting an input device and/or an output device is displayed on the display input unit 617 of the information terminal 102. The selection screen 2301 includes the icon and the device ID "whiteboard 1" of the electronic whiteboard 104-1; and the icon and the device ID "mfp 1" of the MFP 104-2. Additionally, the selection screen 2301 includes an icon and a device ID of another image processing apparatus 104 included in the list information 2201, such as the icon and the device ID "projector 1" of the projector 104-4.

At step S2105 of FIG. 21, the user performs an operation to select an input device and/or an output device in the selection screen 2301, which is displayed on the display input unit 617 of the information terminal 102. If a user desires to output, from the MFP 104-2, image data that is input from the electronic whiteboard 104-1, for example, the user may drag and drop the icon 2302 of the electronic whiteboard 104-1 onto the icon 2303 of the MFP 104-2. According to the embodiment, an input device and an output device can be easily selected, in such a manner.

Upon receiving, at step S2105, the operation to execute image processing from the user, the image processing system 100 executes image processing based on the received specifying information (steps S710 to S718), similar to the above-described embodiment.

FIG. 24 illustrates an example of the specifying information that is transmitted from the information terminal 102 to the relay server 101 at this time. Instead of the destination information and the device information of the input device in the specifying information 1101 according to the above-described embodiment, which is illustrated in FIG. 11, the specifying information 2401 according to the embodiment includes "whiteboard 1," which is the device ID of the input device (the identification information of the image processing apparatus 104 for inputting). Furthermore, instead of the destination information and the device information of the output device in the specifying information 1101 according to the above-described embodiment, which is shown in FIG. 11, the specifying information 2401 includes "mfp 1," which is the device ID of the output device (the identification information of the image processing apparatus 104 for outputting).

According to the embodiment, an input device and an output device can be easily selected because a list of the at least one available image processing apparatus 104 is displayed on the display input unit 617 of the information terminal 102.

An image processing system 100 according to the embodiment of the present invention includes at least one image processing apparatus 104; an information terminal 102; and an information processing device 101 configured to communicate with the at least one image processing apparatus 104 and the information terminal 102.

The information terminal (102) includes a specifying information transmitter 613 configured to transmit, to the information processing device 101, specifying information 1101 for specifying, from the at least one image processing apparatus 104, an image processing apparatus for inputting and an image processing apparatus for outputting.

The information processing device 101 includes an input data retrieval unit 604 configured to obtain, based on the specifying information 1101 received from the information terminal 102, input data from the image processing apparatus for inputting. The information processing device 101 further includes an output data transmitter 606 configured to transmit, based on the received specifying information 1101, output data based on the obtained input data to the image processing apparatus for outputting.

By the above-described configuration, the image processing system 100 may make it easier to control, by using the information terminal 102, such as a smart device, image processing that is to be executed by the plurality of image processing apparatuses 104, while preventing information of the data to be processed from being leaked.

The information processing system, the image processing method, and the non-transitory storage medium storing the image processing program are described by the above-described embodiments. However, the information processing system, the image processing method, and the non-transitory storage medium storing the image processing program according to the present invention are not limited to the above-described embodiments, and various modifications and improvements may be made within the scope of the present invention. Specific examples of numerical values are used in order to facilitate understanding of the invention. However, these numerical values are simply illustrative, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processing unit in a functional block does not necessarily correspond to a boundary of a physical component. An operation by a plurality of functional units may be physically executed by a single component. Alternatively, an operation by a single functional unit may be physically executed by a plurality of components. For the convenience of explanation, the devices according to the embodiment of the present invention are explained by using the functional block diagrams. However, these devices may be implemented in hardware, software, or combinations thereof. The software that operates in accordance with the present invention may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

The present invention can be implemented in any convenient form, for example using dedicated hardware, or a mixture of dedicated hardware and software. The present invention may be implemented as computer software implemented by one or more network processing apparatuses. The network can comprise any conventional terrestrial or wireless communications network, such as the Internet. The processing apparatuses can compromise any suitable programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device. The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

What is claimed is:

1. An information terminal comprising:
a network interface that connects, through a network, to an information processing device for requesting an output device to execute an output process depending on a processing result of an input device for executing an input process;
a processor; and
a memory that includes instructions, which when executed, cause the processor to execute the following steps:
receiving, from one device among the input device and the output device, capability information including a first setting corresponding to a first process executable by the one device and a second setting corresponding to a second process executable by the one device, and connection information for connecting to the one device, the processor receiving the first setting and the second setting from the same device;
receiving an input via a screen displayed on a display; the input indicating that the one device is the input device or the output device;
determining the first setting or the second setting, based on whether the input indicates that the one device is the input device or the output device;
requesting the information processing device to cause execution of the input process and the output process, based on the determined first setting or second setting, and the connection information; wherein the executed input process or the executed output process is the first process or the second process corresponding to the determined first setting or second setting, and is executed by the one device.

2. A method executed by an information terminal including a network interface that connects, through a network, to an information processing device for requesting an output device to execute an output process depending on a processing result of an input device for executing an input process, the method comprising:
receiving, by the information terminal from one device among the input device and the output device, capability information including a first setting corresponding to a first process executable by the one device and a second setting corresponding to a second process executable by the one device, and connection information for connecting to the one device, the information terminal receiving the first setting and the second setting from the same device;
receiving, by the information terminal, an input via a screen displayed on a display; the input indicating that the one device is the input device or the output device;
determining the first setting or the second setting, based on whether the input indicates that the one device is the input device or the output device;
requesting, by the information terminal, the information processing device to cause execution of the input process and the output process, based on the determined first setting or second setting, and the connection information; wherein the executed input process or the executed output process is the first process or the second process corresponding to the determined first setting or second setting, and is executed by the one device.

3. A system comprising:
an information terminal;
an information processing device that requests an output device to execute an output process depending on a processing result of an input device,
wherein the information terminal includes
a network interface that connects to the information processing device through a network;
a processor; and
a memory that includes instructions, which when executed, cause the processor to execute the following steps:
receiving, from one device among the input device and the output device, capability information including a first setting corresponding to a first process executable by the one device and a second setting corresponding to a second process executable by the one device, and connection information for connecting to the one device, the processor receiving the first setting and the second setting from the same device;
receiving an input via a screen displayed on a display; the input indicating that the one device is the input device or the output device;
determining the first setting or the second setting, based on whether the input indicates that the one device is the input device or the output device;
requesting the information processing device to cause execution of the input process and the output process, based on the determined first setting or second setting, and the connection information; wherein the executed input process or the executed output process is the first process or the second process corresponding to the determined first setting or second setting, and is executed by the one device.

* * * * *